Figure 1:
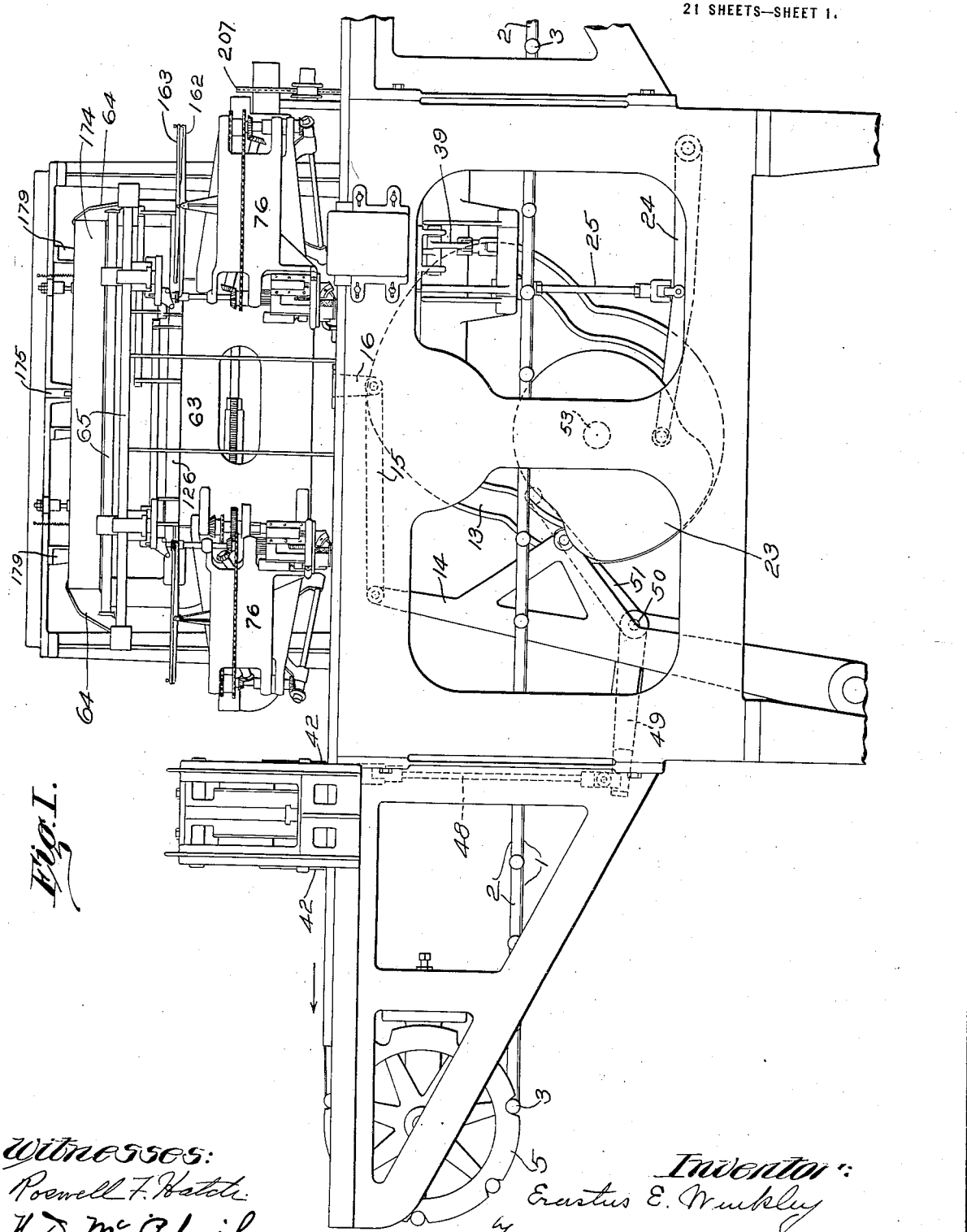

E. E. WINKLEY.
MACHINE FOR CUTTING SHEET RUBBER.
APPLICATION FILED AUG. 3, 1912.

1,177,577.

Patented Mar. 28, 1916.
21 SHEETS—SHEET 2.

Witnesses:
Powell F. Hatch
H. D. McPhail

Inventor:
Erastus E. Winkley
by Phillips Van Everen & Fish
Attys

E. E. WINKLEY.
MACHINE FOR CUTTING SHEET RUBBER.
APPLICATION FILED AUG. 3, 1912.

1,177,577.

Patented Mar. 28, 1916.
21 SHEETS—SHEET 3.

E. E. WINKLEY.
MACHINE FOR CUTTING SHEET RUBBER.
APPLICATION FILED AUG. 3, 1912.

1,177,577.

Patented Mar. 28, 1916.
21 SHEETS—SHEET 6.

E. E. WINKLEY.
MACHINE FOR CUTTING SHEET RUBBER.
APPLICATION FILED AUG. 3, 1912.

1,177,577.

Patented Mar. 28, 1916.
21 SHEETS—SHEET 8.

Witnesses:
Powell F. Hatch.
K. D. McPhail

Inventor:
Erastus E. Winkley
by Phillips Van Everen & Fish
Attys

E. E. WINKLEY.
MACHINE FOR CUTTING SHEET RUBBER.
APPLICATION FILED AUG. 3, 1912.

1,177,577.

Patented Mar. 28, 1916.
21 SHEETS—SHEET 9.

Witnesses:
Powell F. Hatch.
H. D. McPhail.

Inventor:
Erastus E. Winkley
by
Phillips Van Everen & Fish
Attys.

E. E. WINKLEY.
MACHINE FOR CUTTING SHEET RUBBER.
APPLICATION FILED AUG. 3, 1912.
1,177,577.
Patented Mar. 28, 1916.
21 SHEETS—SHEET 10.
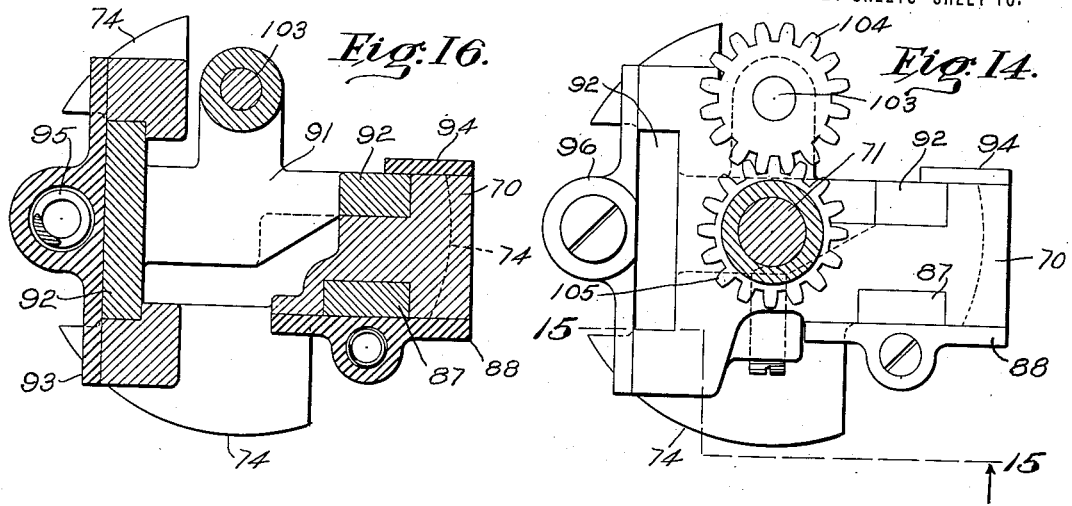
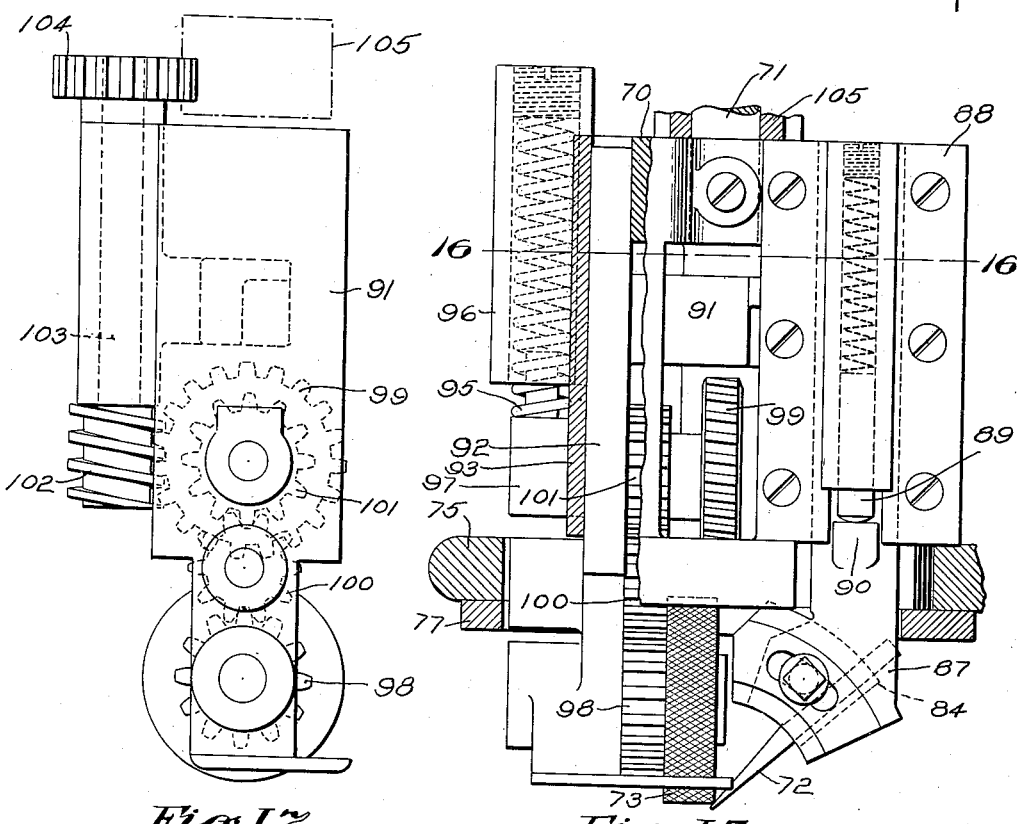

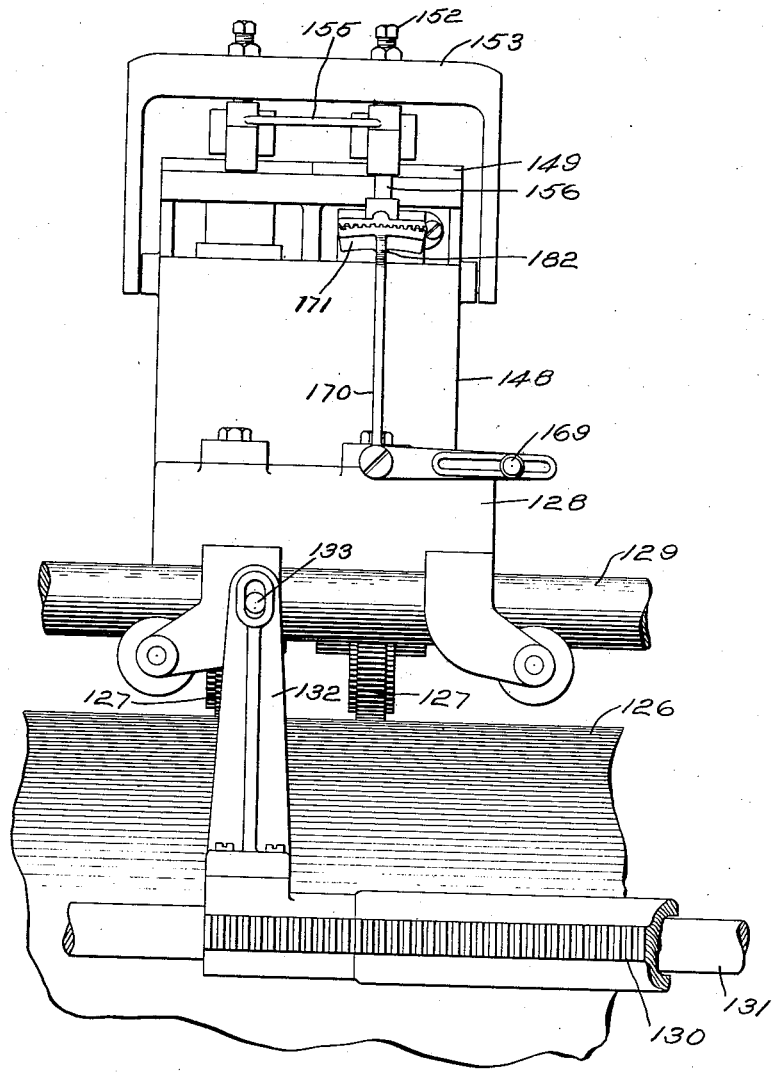

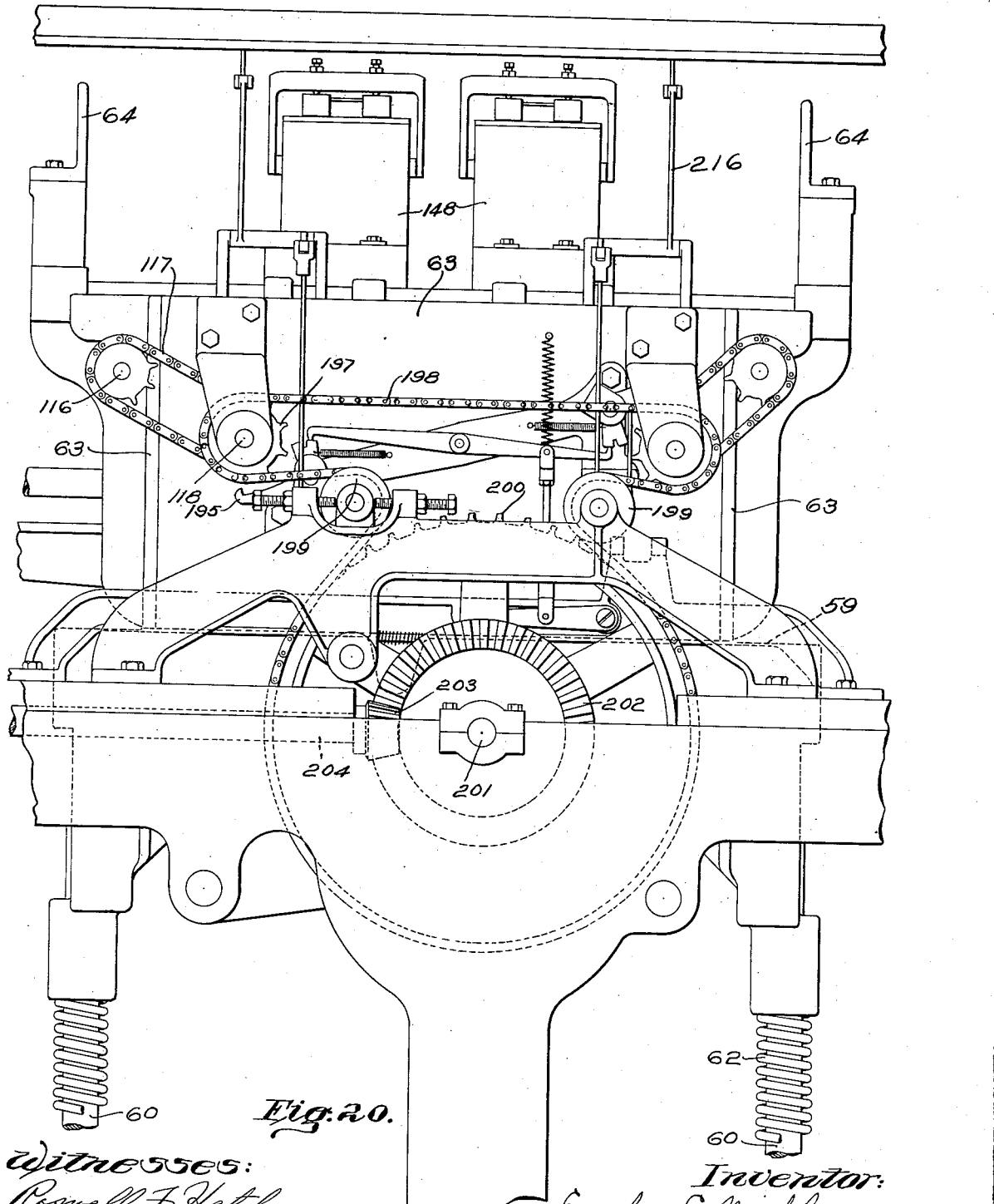

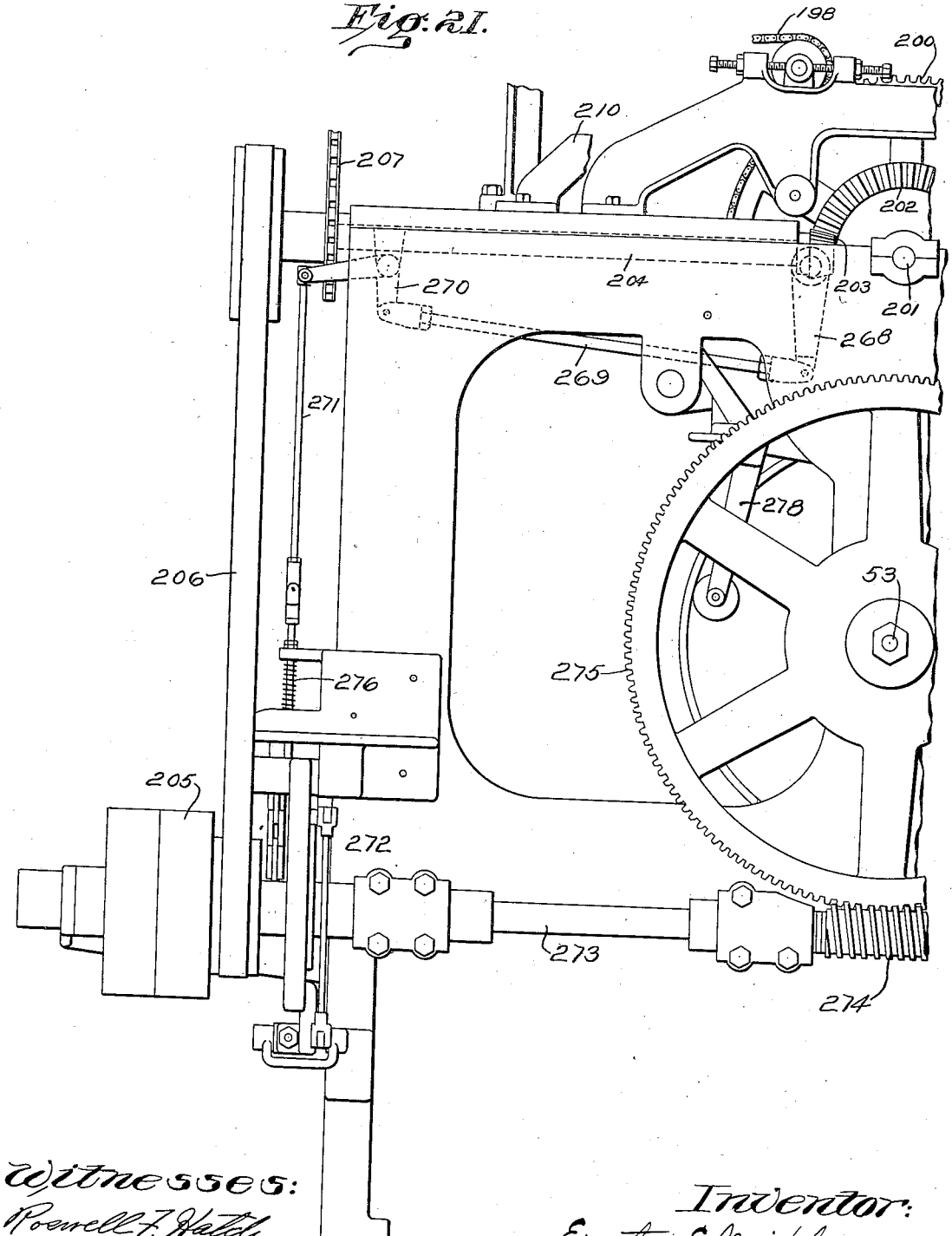

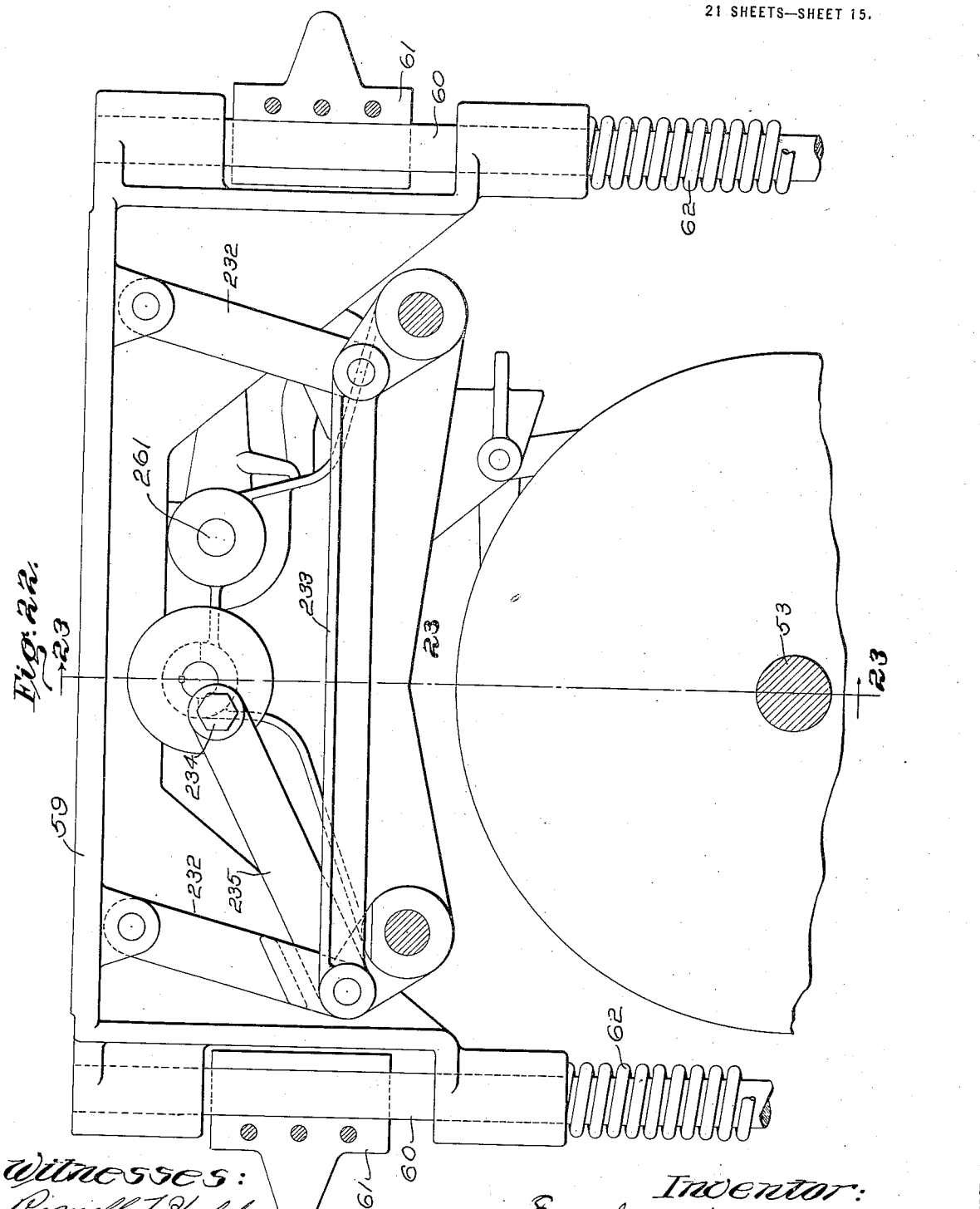

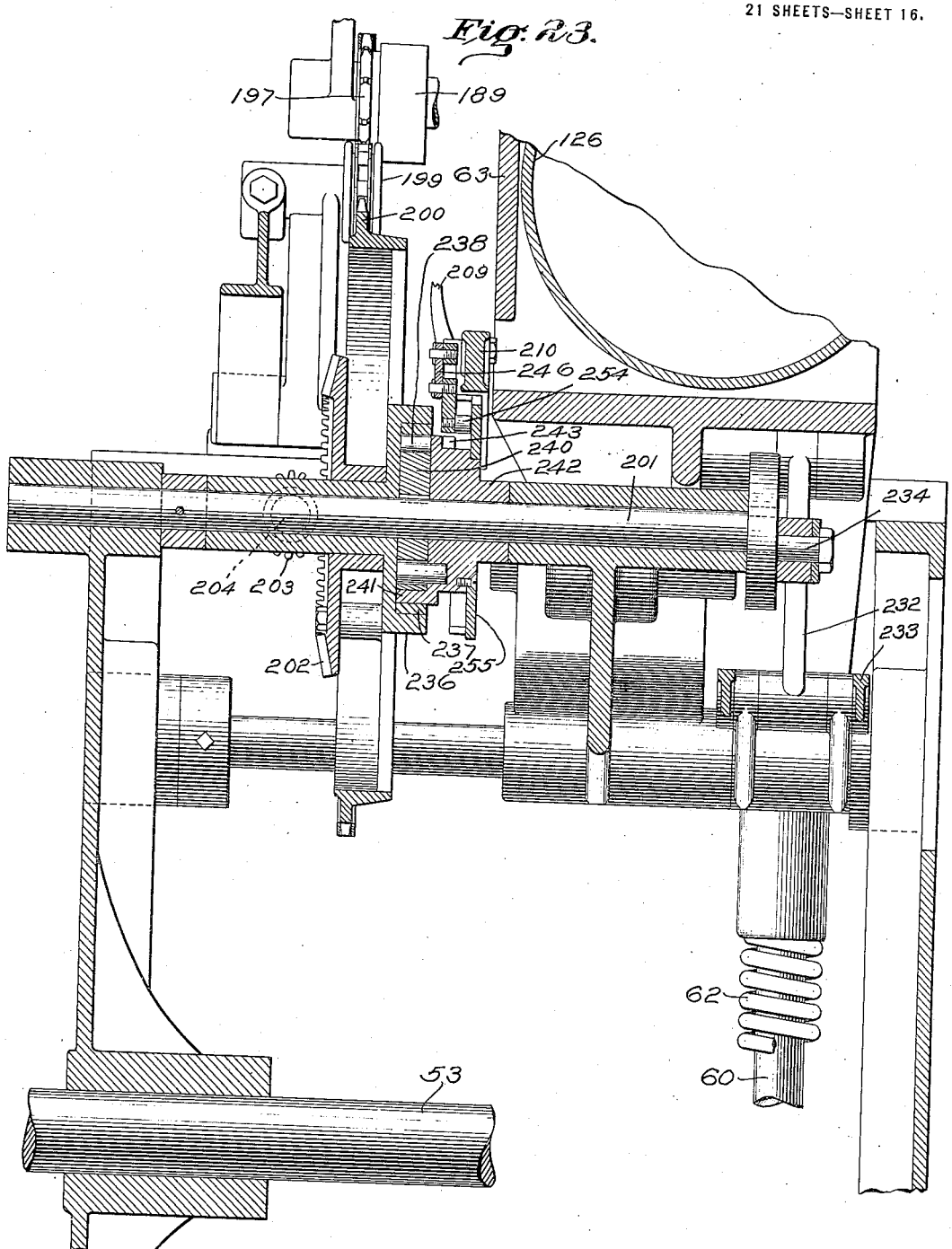

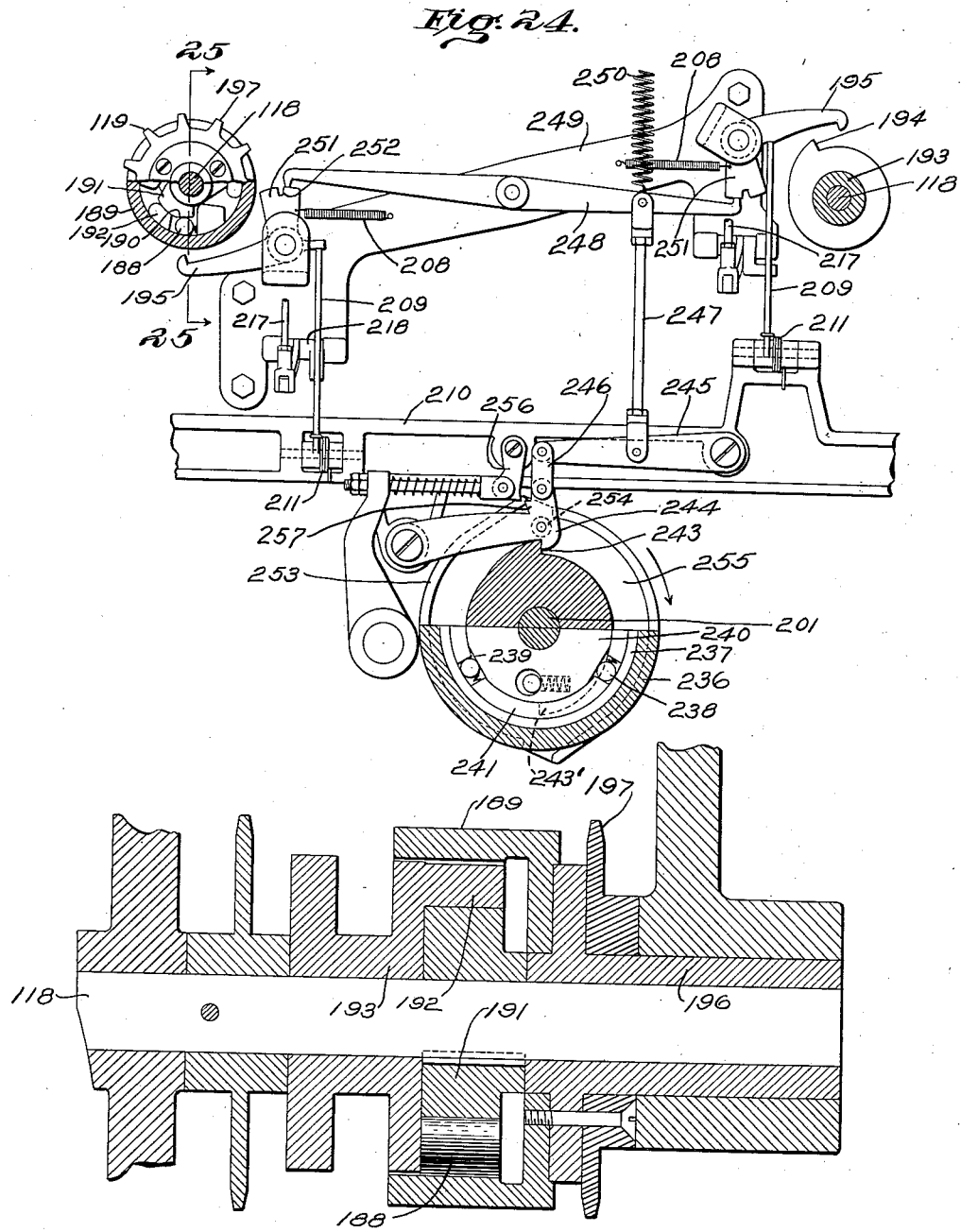

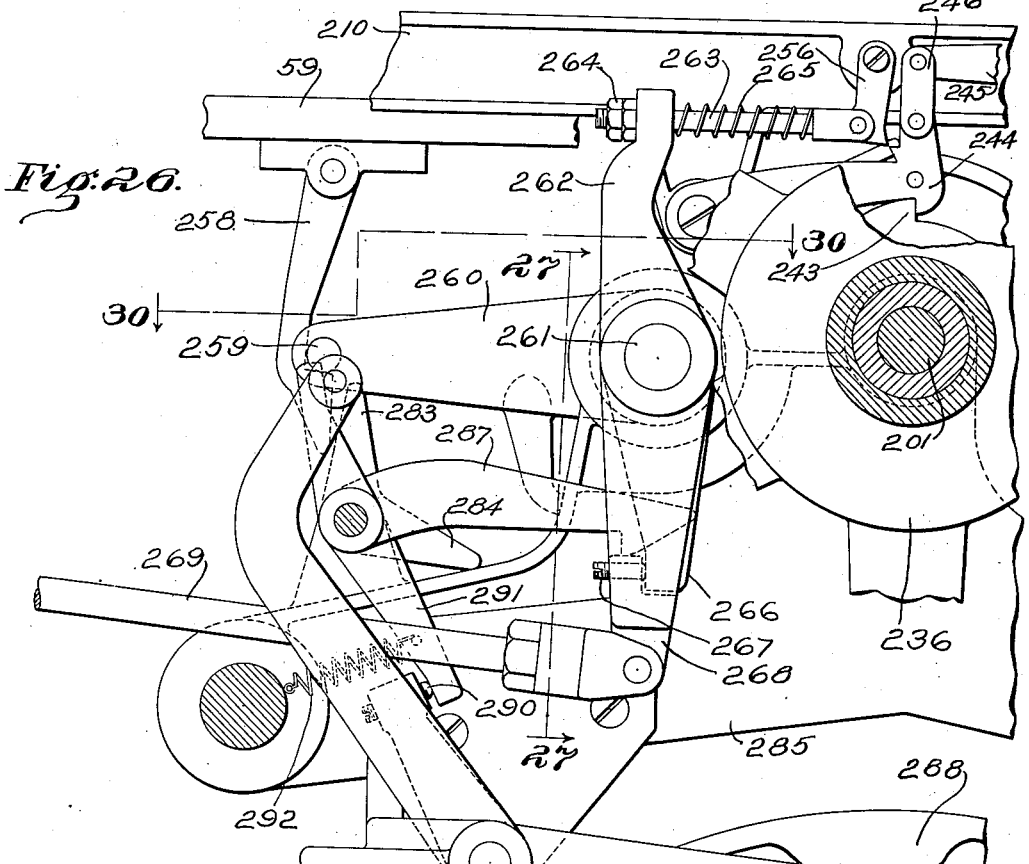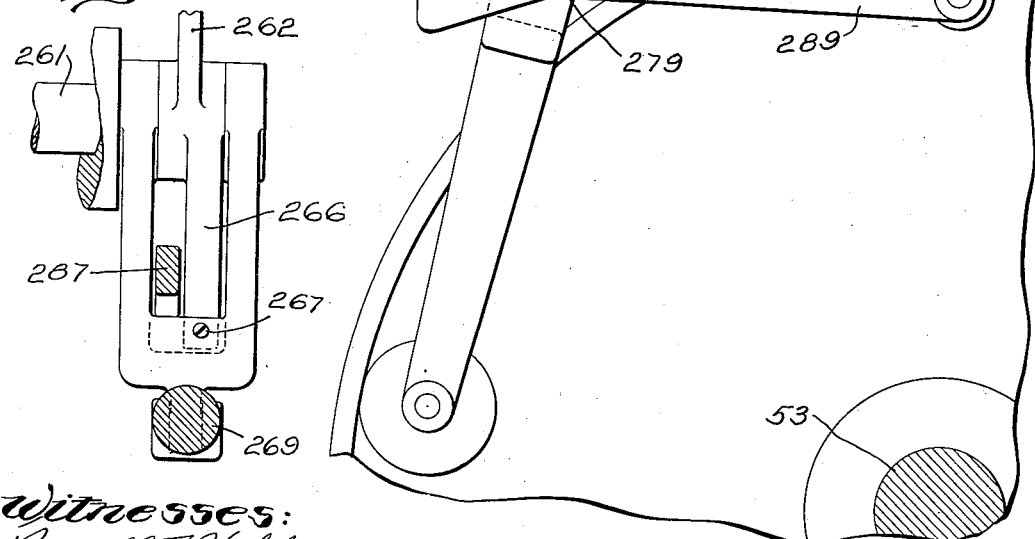

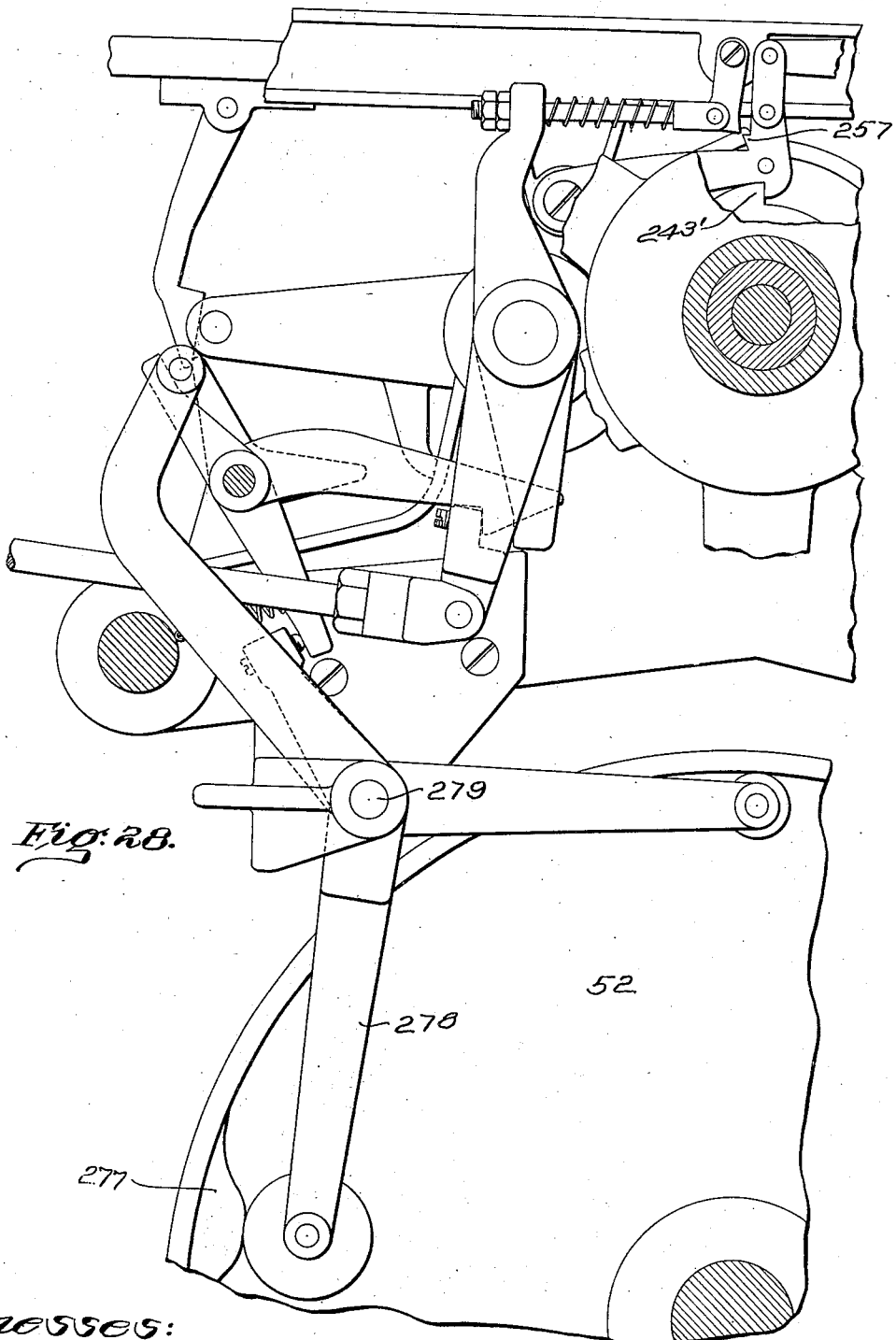

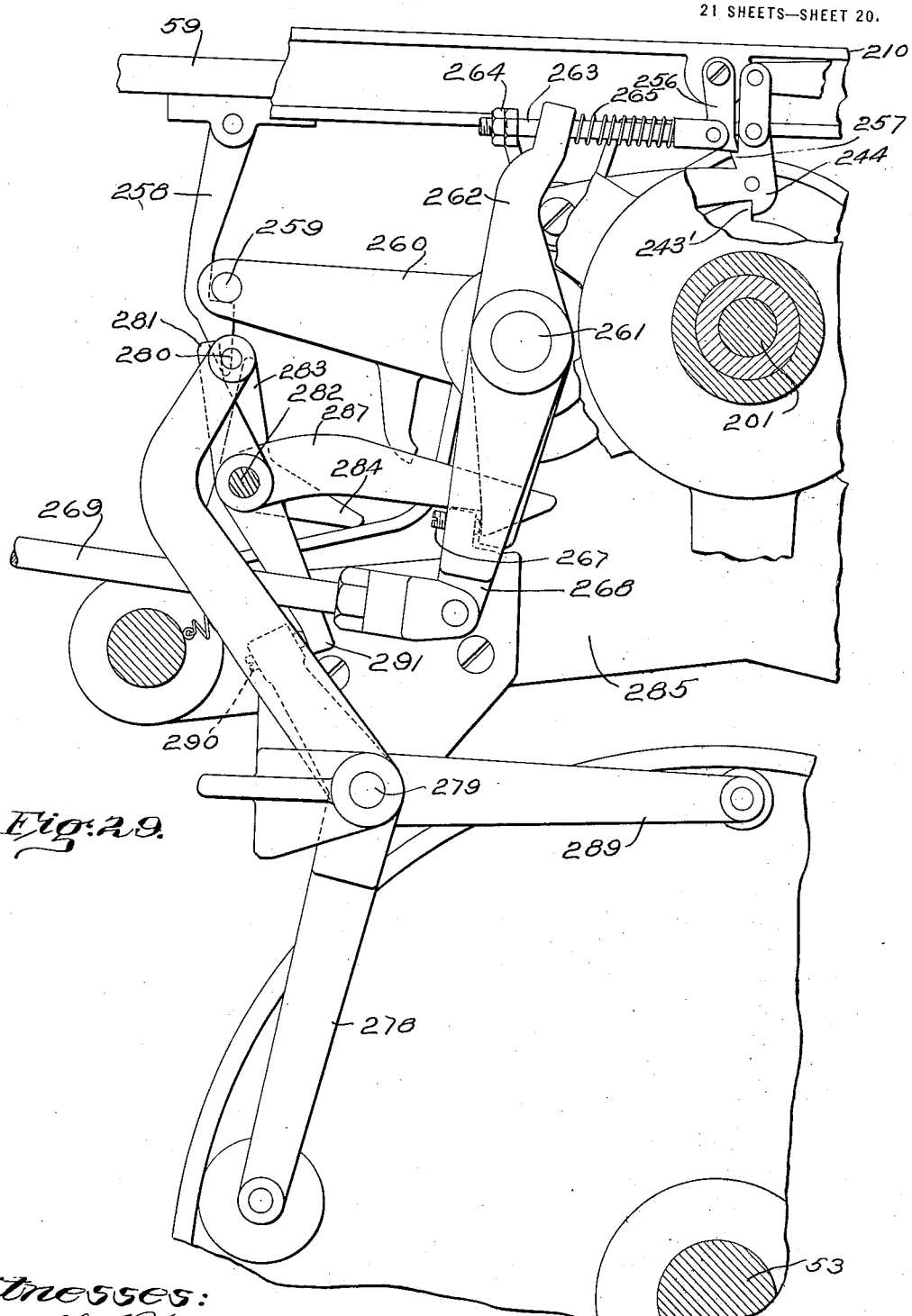

E. E. WINKLEY.
MACHINE FOR CUTTING SHEET RUBBER.
APPLICATION FILED AUG. 3, 1912.
1,177,577.
Patented Mar. 28, 1916.
21 SHEETS—SHEET 21.
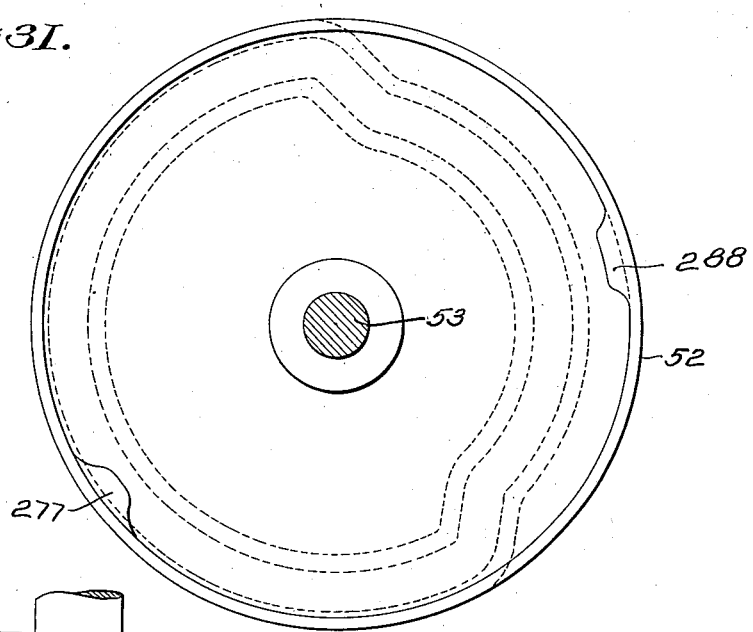
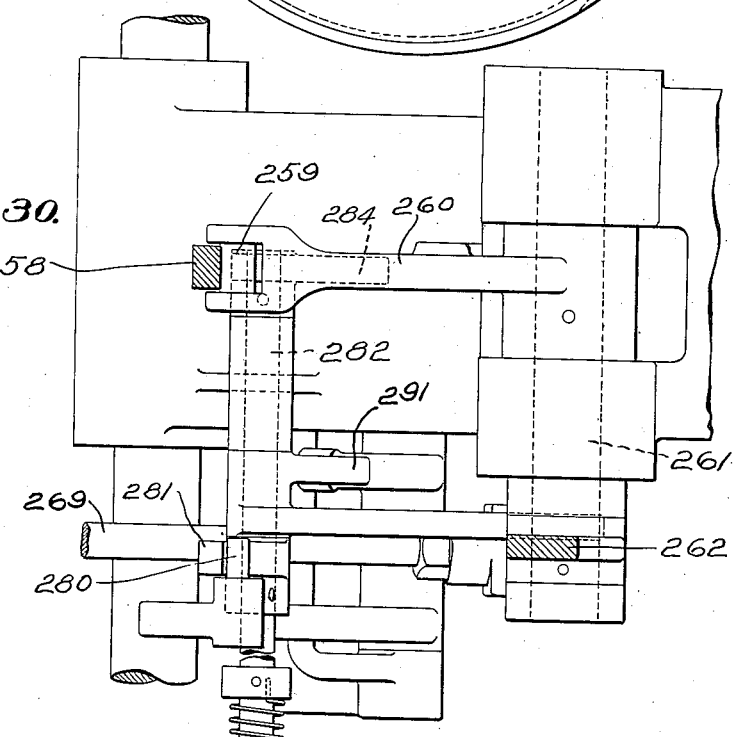

UNITED STATES PATENT OFFICE.

ERASTUS E. WINKLEY, OF LYNN, MASSACHUSETTS.

MACHINE FOR CUTTING SHEET-RUBBER.

1,177,577. Specification of Letters Patent. Patented Mar. 28, 1916.

Application filed August 3, 1912. Serial No. 713,157.

*To all whom it may concern:*

Be it known that I, ERASTUS E. WINKLEY, a citizen of the United States, residing at Lynn, in the county of Essex and State of Massachusetts, have invented certain new and useful Improvements in Machines for Cutting Sheet-Rubber; and I do hereby declare the following to be a full, clear, and exact description of the invention, such as will enable others skilled in the art to which it appertains to make and use the same.

The invention relates to machines for cutting articles from sheet material, and more particularly to machines which are adapted to cut shoe soles from sheets of rubber compound.

The object of the invention is to provide a machine of this character having a novel and improved construction and mode of operation whereby rubber shoe soles or other articles may be rapidly and accurately cut from rubber or other sheet material and medallions accurately impressed thereon, if desired, without requiring the services of a skilled operator, and without danger of injuring or defacing the material entering into the articles.

To these ends the invention consists in the features of construction and combinations of parts hereinafter described and claimed, the advantages of which will be apparent to those skilled in the art.

The various features of the invention will be readily understood from an inspection of the accompanying drawings and the following detailed description of the machine illustrated therein.

Figure 2:
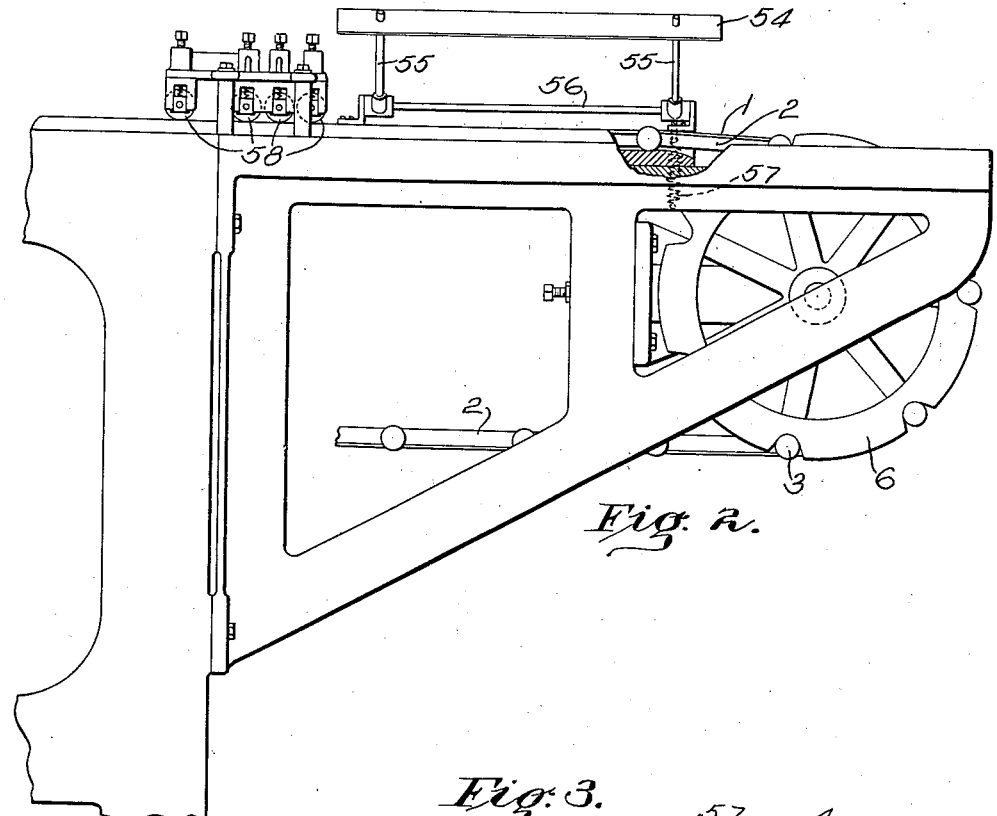
Figure 3:
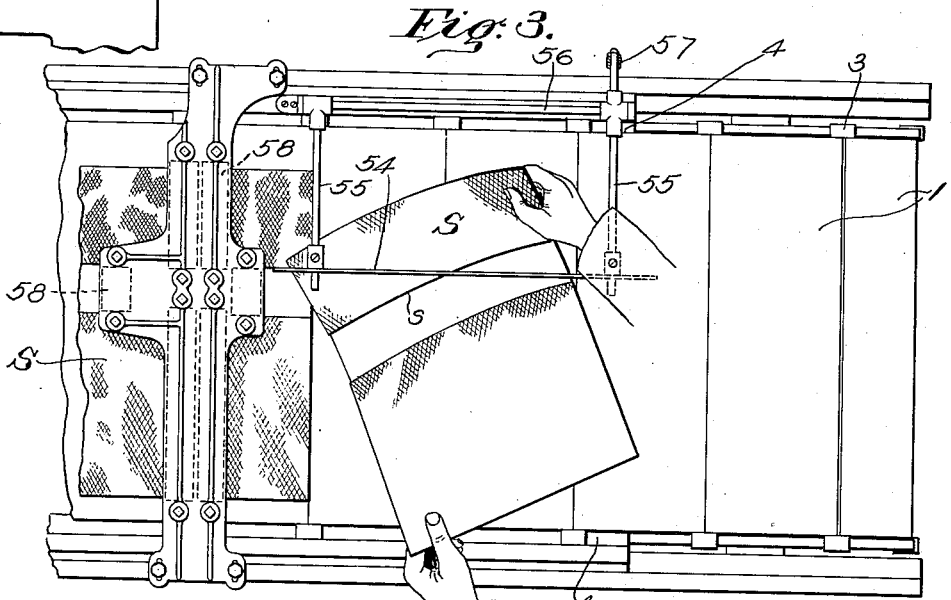
Figure 4:
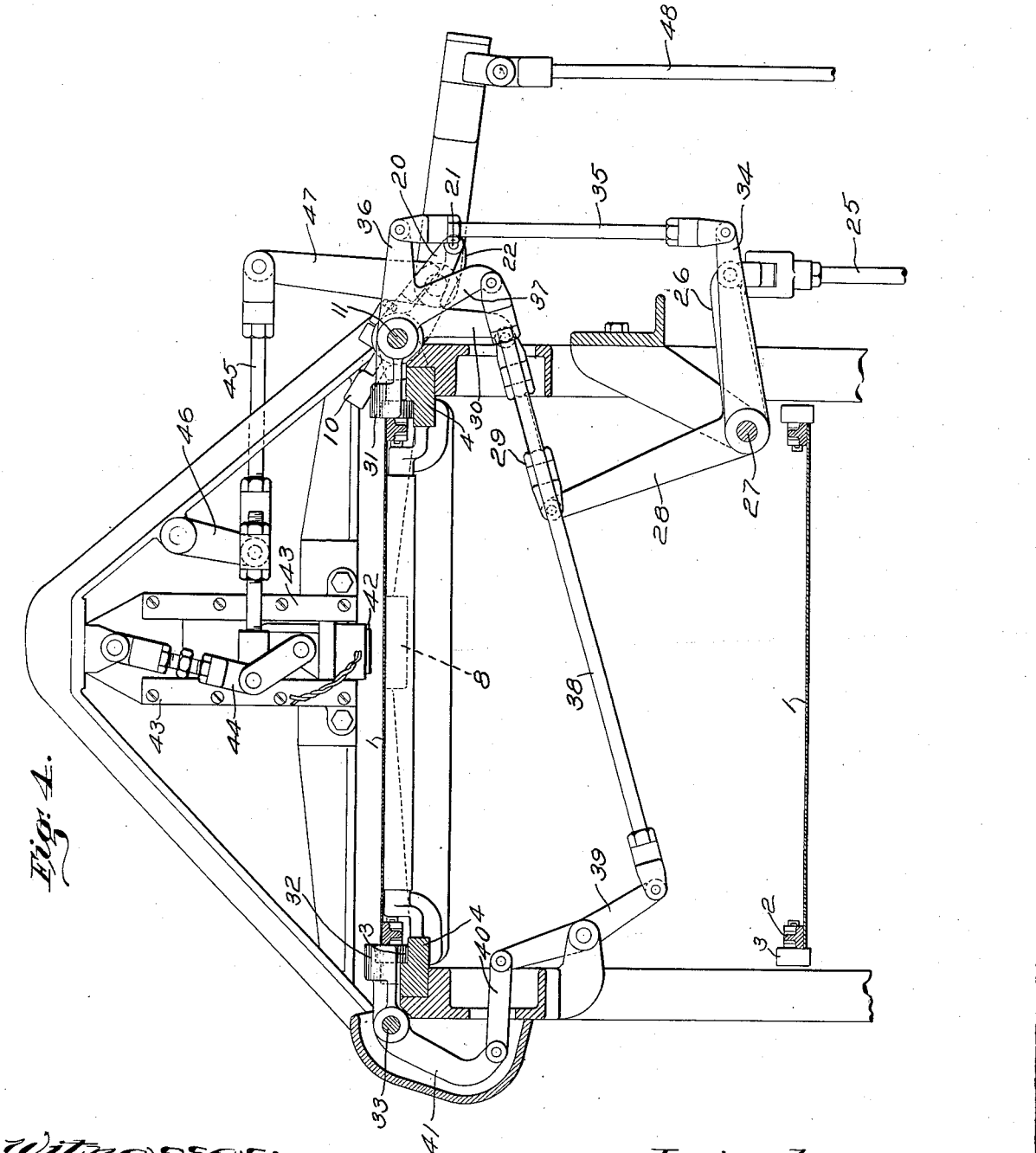
Figure 5:
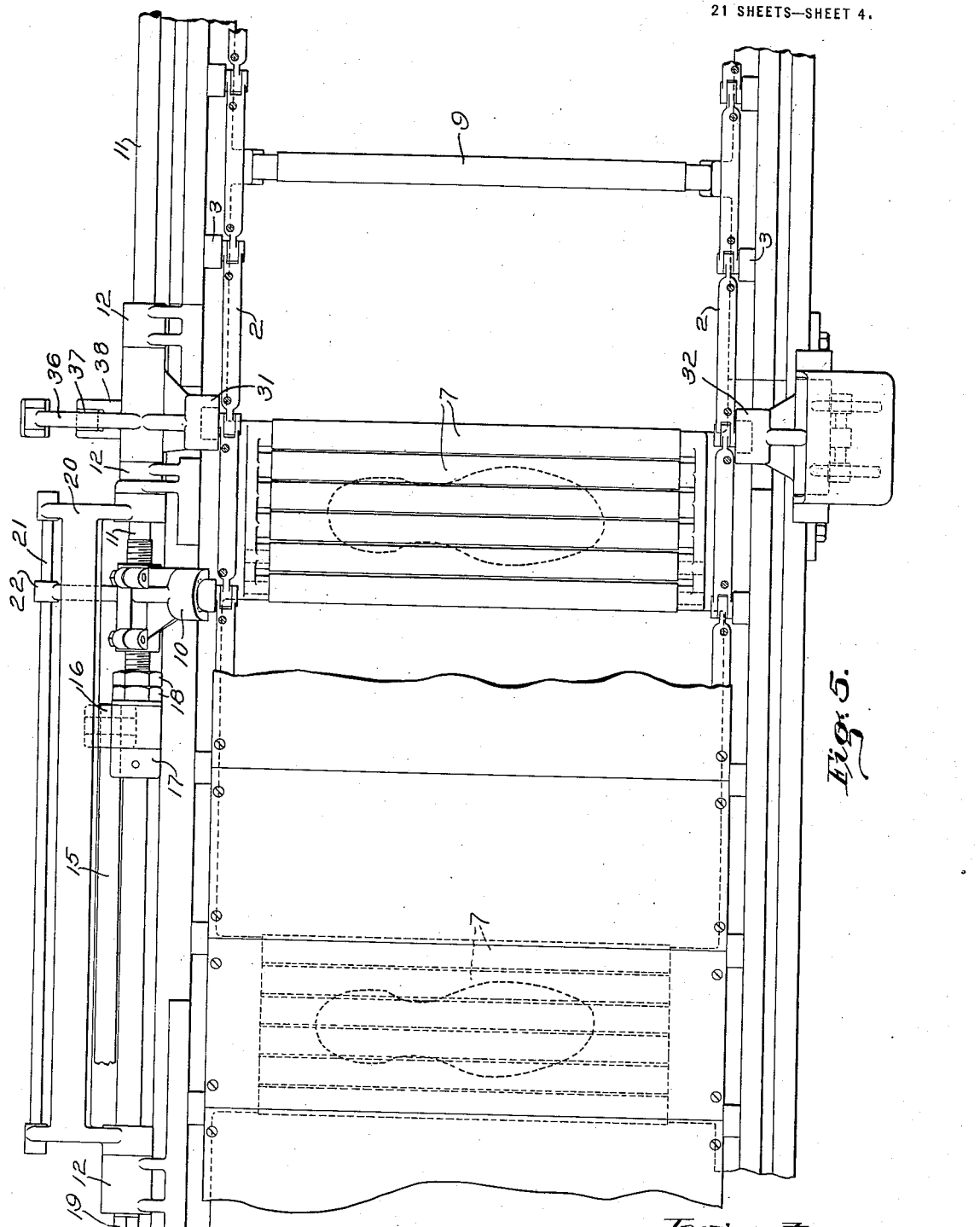
Figure 6:
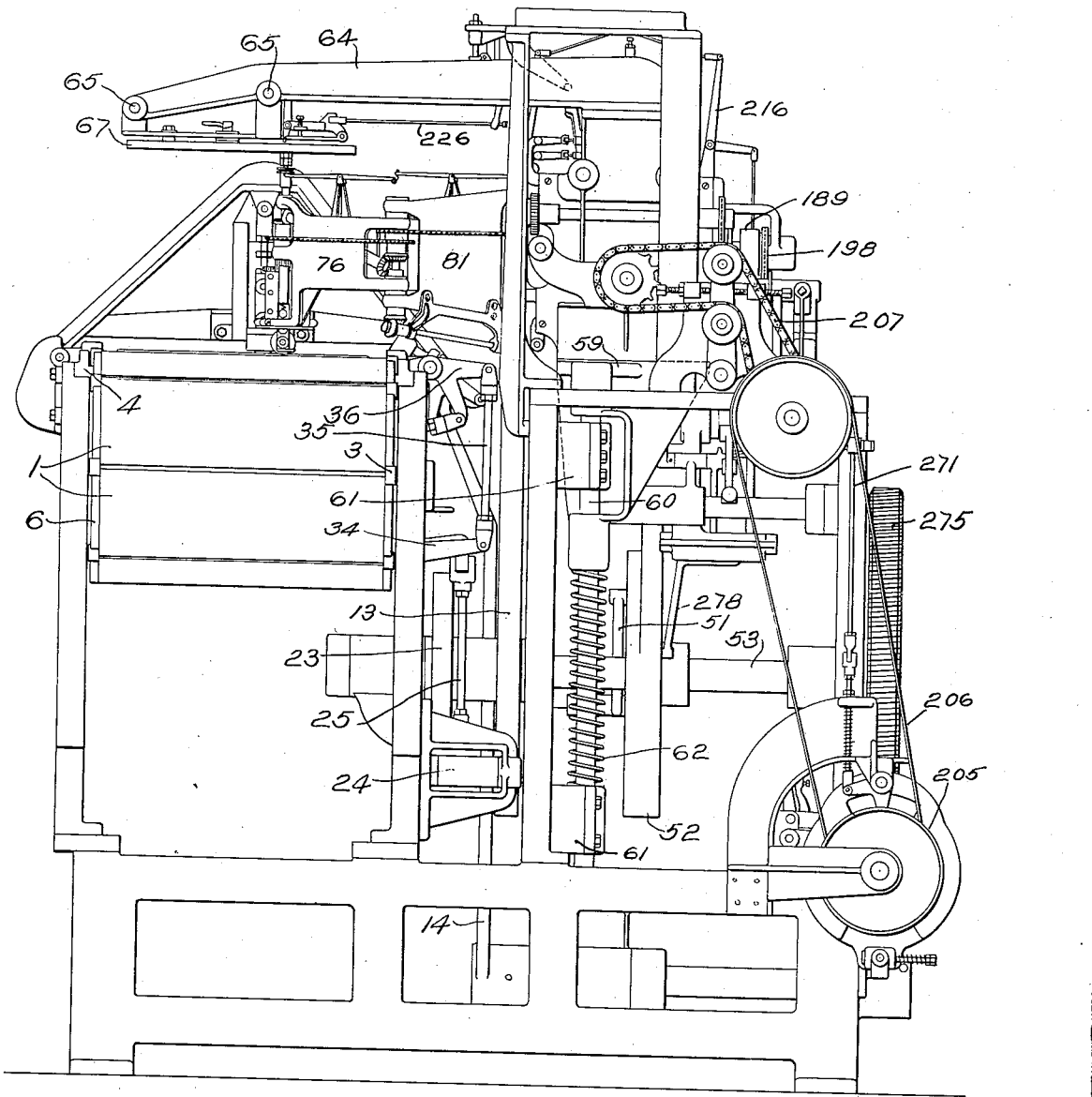
Figure 7:
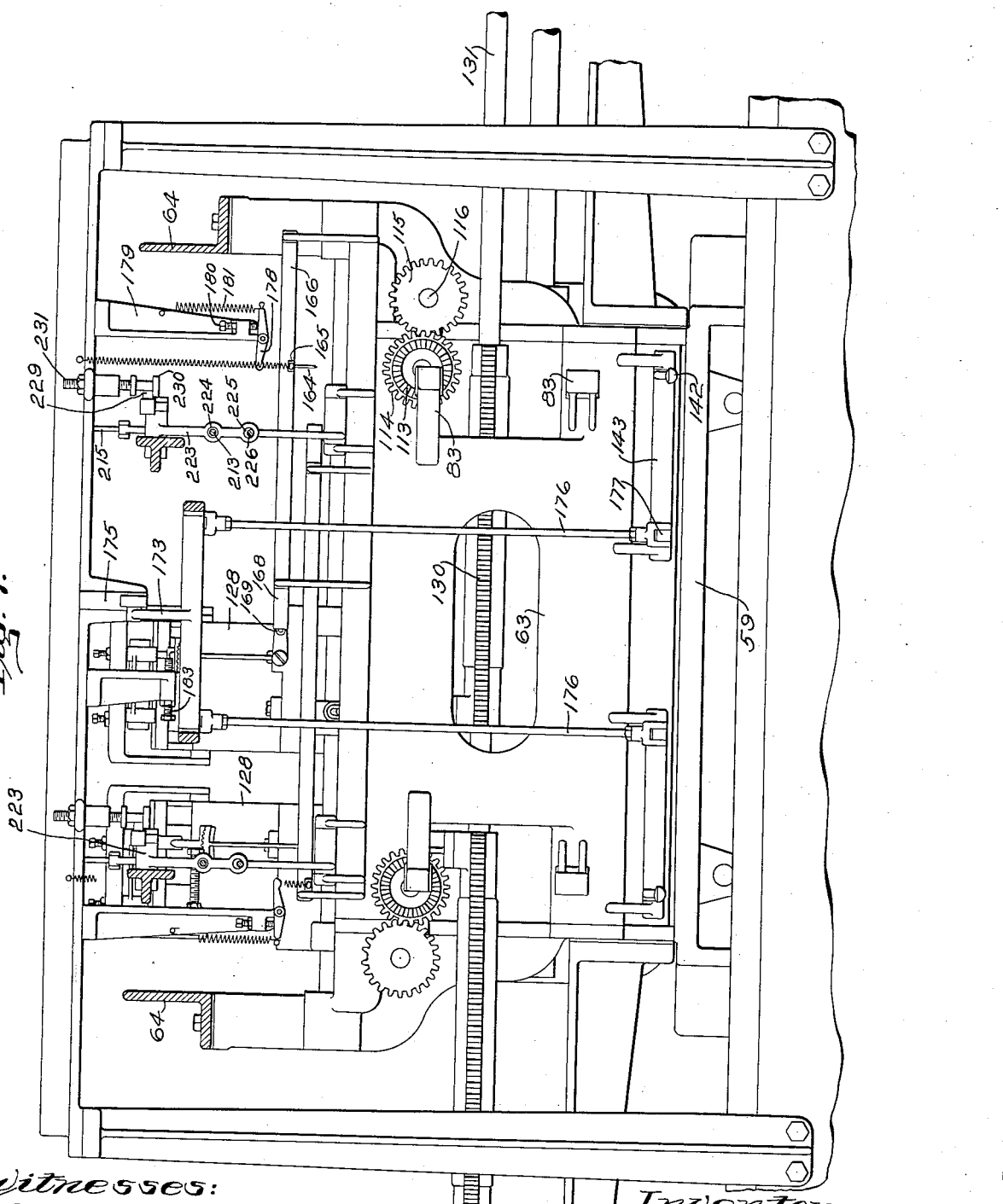
Figure 8:
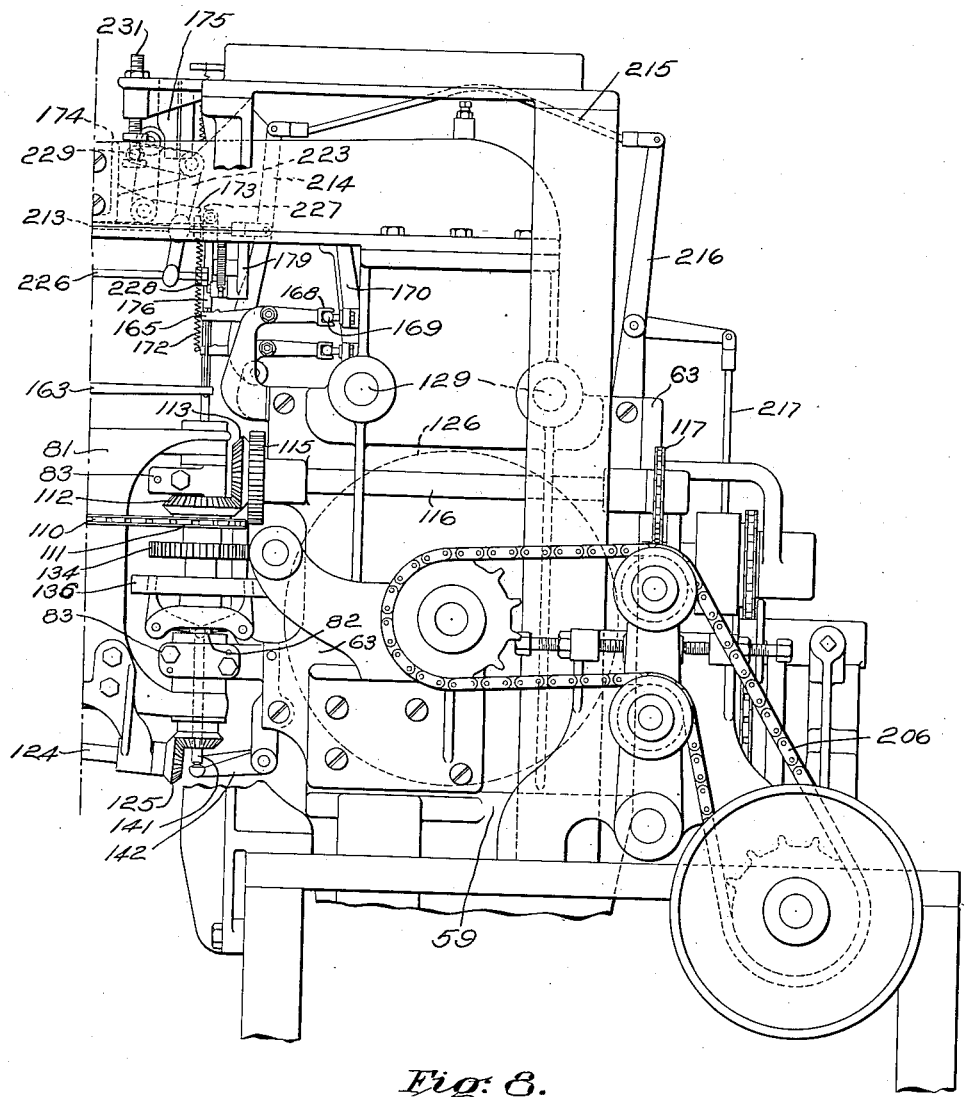
Figure 9:
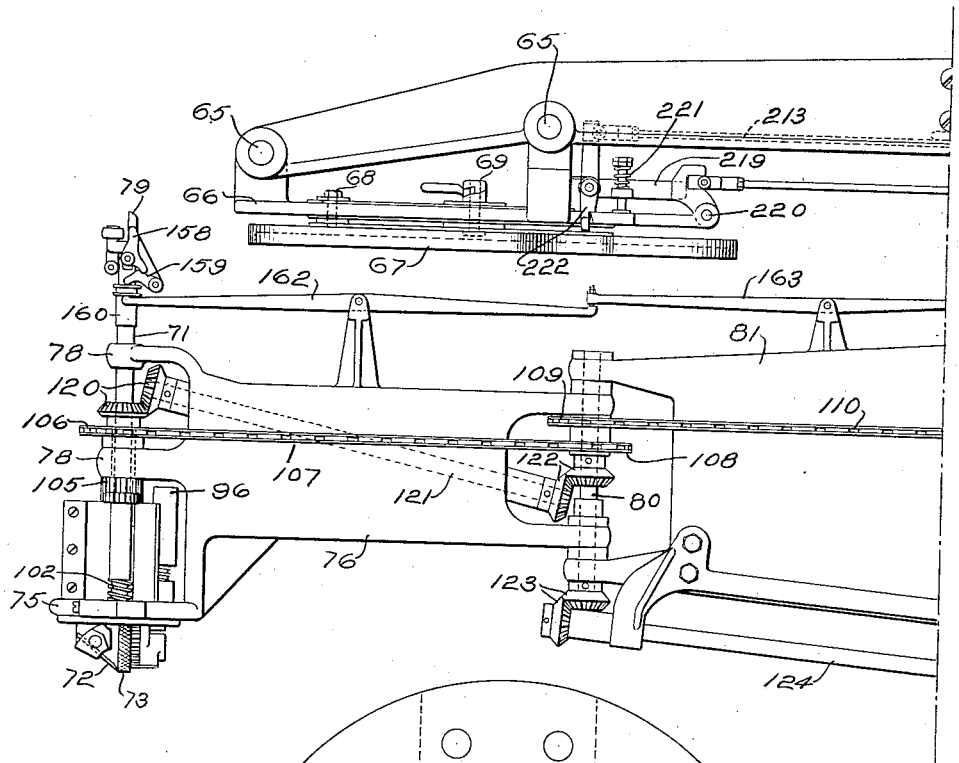
Figure 10:
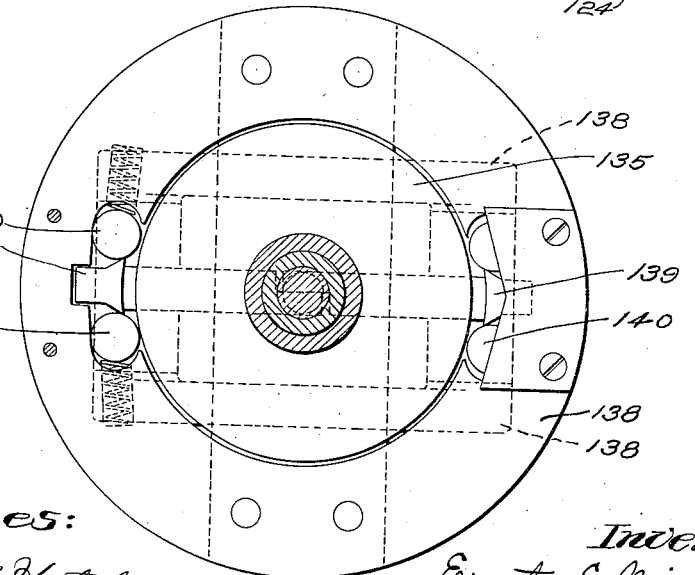
Figure 11:
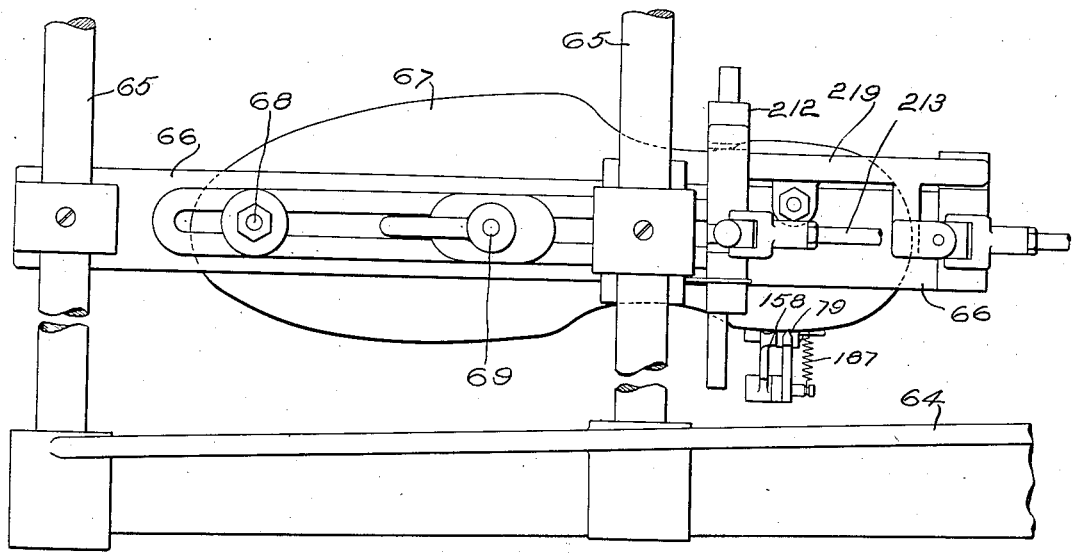
Figures 12, 13:
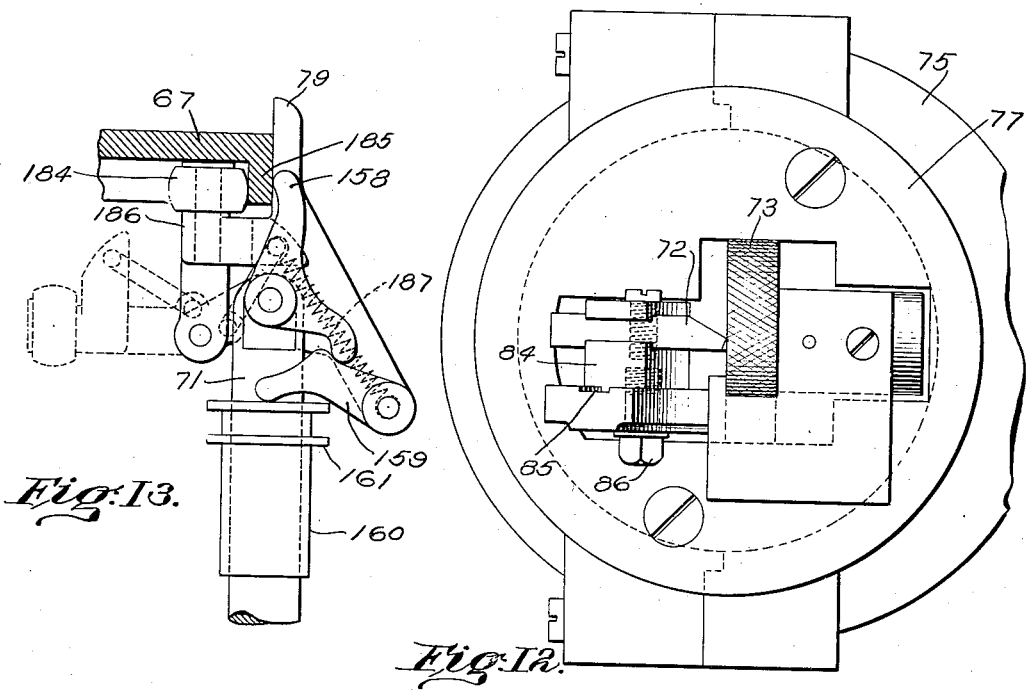
Figure 18:
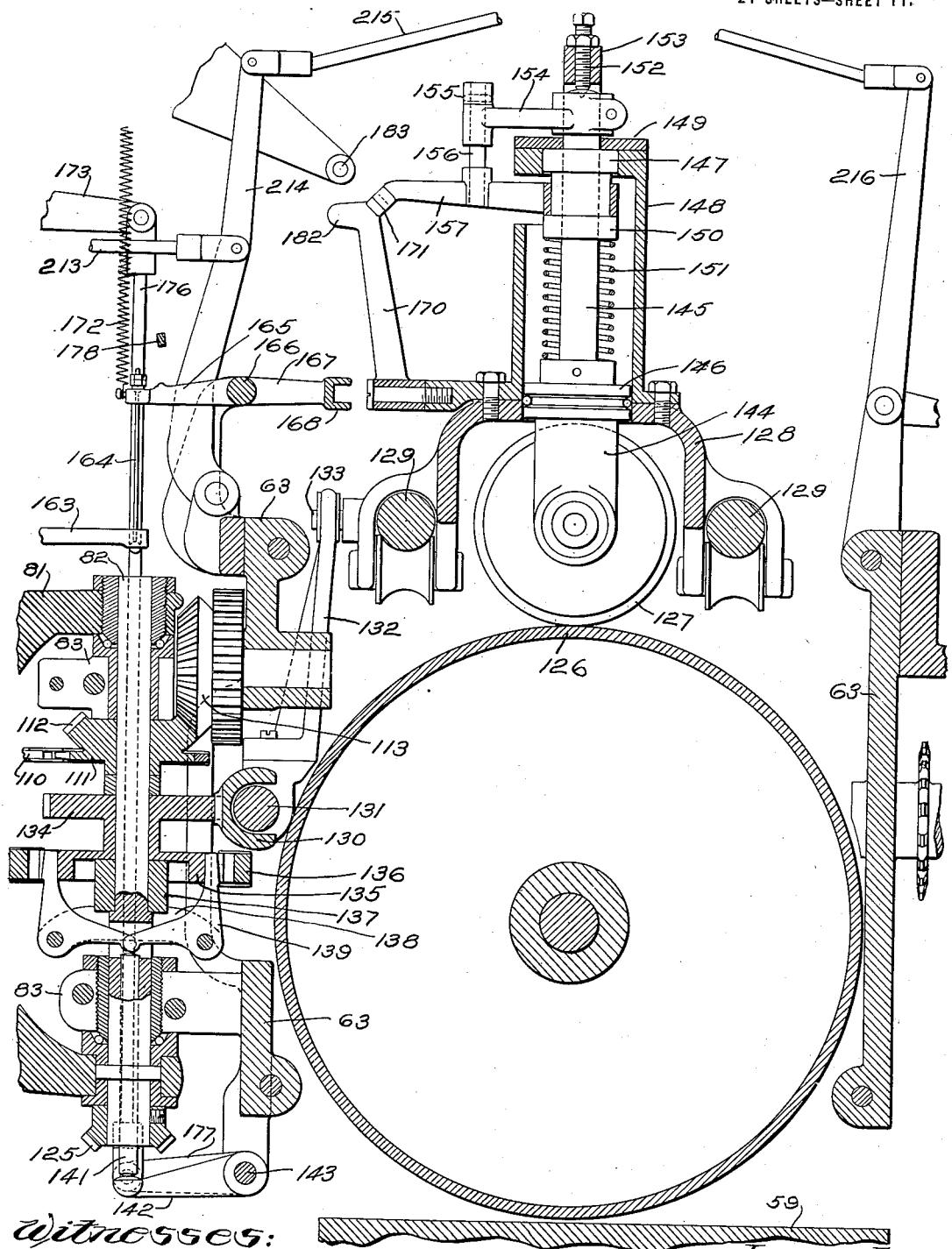

In the drawings, Figure 1 is a front elevation of a machine embodying the invention, the right-hand end of the machine being broken away; Fig. 2 is a front elevation of the right-hand end of the machine; Fig. 3 is a plan view of the part of the machine shown in Fig. 2; Fig. 4 is a transverse sectional elevation showing the mechanism for locking and feeding the work supporting table, and also showing the medallion impressing mechanism; Fig. 5 is a plan view of a part of the work supporting table and the feeding and locking mechanism therefor; Fig. 6 is an end elevation of the right-hand end of the machine; Fig. 7 is a front elevation of the cutter controlling mechanism, the arms supporting the cutter heads being removed and the arms supporting the pat- terns being broken away to show the parts back of them; Figs. 8 and 9 show an end elevation of the mechanism for operating and controlling the cutter heads, the parts being shown in a larger scale than in Fig. 7; Fig. 10 is a sectional plan view of the clutch for disconnecting a cutter head from the mechanism which turns it; Fig. 11 is a detail plan view of one of the patterns; Fig. 12 is a bottom plan view of one of the cutter heads; Fig. 13 is a detailed elevation showing parts carried at the upper end of the cutter heads; Fig. 14 is a plan view of a cutter carrying head removed from its supporting bearings; Fig. 15 is a sectional elevation of the lower part of a cutter head taken on the line 15—15, Fig. 14; Fig. 16 is a sectional view taken on line 16—16, Fig. 15; Fig. 17 is a detailed elevation of the feed wheel carrying slide removed from the cutter head; Fig. 18 is a vertical sectional elevation taken through the axis of one of the shafts upon which the supporting arms for one of the cutter heads are mounted; Fig. 19 is a partial front elevation of parts shown in Fig. 18; Fig. 20 is a partial rear elevation of the machine; Fig. 21 is a partial rear elevation showing the driving mechanism; Fig. 22 is a rear elevation of a part of the devices for raising and lowering the support upon which the cutter heads and the mechanisms for operating them are carried; Fig. 23 is a detailed sectional view on line 23—23, Fig. 22; Fig. 24 is a detailed rear elevation showing a part of the mechanism for controlling the raising and lowering of the supports for the cutter heads and their operating mechanisms; Fig. 25 is a sectional detail on line 25—25, Fig. 24; Fig. 26 is a detailed rear elevation showing the devices through which the various mechanisms of the machine are automatically controlled; Fig. 27 is a detailed sectional view on line 27—27, Fig. 26; Figs. 28 and 29 are views similar to Fig. 26, showing the parts in different positions; Fig. 30 is a horizontal sectional view on line 30—30, Fig. 26; and Fig. 31 is a detail showing one of the cams.

The machine illustrated in the drawings is especially designed to cut shoe soles from sheets of rubber compound, and to impress thereon the medallions which usually appear near the middle of each sole. This machine comprises a work supporting table, means for pressing the sheet rubber stock evenly upon the surface of the work support, two cutting mechanisms which operate to simultaneously cut shoe soles from the stock supported upon the table, and mechanism for impressing medallions on the stock carried by the table. By these mechanisms the rubber soles may be rapidly and accurately cut, and the medallions accurately positioned upon the soles.

Each cutting mechanism comprises a form or pattern, the outline of which corresponds to the outline of the sole to be cut, a cutter carrying head, and feeding and controlling mechanism for the head which causes the cutter to travel along the material to be cut in a path corresponding to the outline of the pattern. Each cutter is operated and controlled independently of the other, and as each cutter finishes cutting a sole its operating and controlling mechanism is thrown out of operation. When both cutters have finished their cutting operation the cutter carrying heads are raised to disengage the cutters from the stock, and mechanism for shifting the stock supporting table to present a new portion of the stock to the cutters is thrown into action. As the shifting movement of the table is completed the medallion impressing mechanism is operated to impress one or more medallions upon the cut soles, and the cutter carrying heads are lowered to engage the cutters with the stock on the table, and the operating and controlling mechanism for each cutter head is again thrown into action. The sheets of stock are placed upon the table by the operator, and as they are advanced into position to register with the cutters, are operated upon by pressure rolls which press them uniformly and evenly upon the surface of the table.

In the machine shown in the drawings the sheets S of rubber stock from which the shoe soles are to be cut are carried upon an intermittently moving work supporting table consisting of a series of thin flat plates 1 secured to side bars 2 which are pivoted together to form an endless carrier for the plates of the feed table. The pivot studs carry rolls 3 which travel on longitudinal guides 4 and engage recesses in the supporting wheels 5 and 6 which are arranged at opposite ends of the machine frame. (Figs. 1 to 6). The plates of the work table are supported at the points where the stock is acted upon by the cutters by a series of supporting rollers 7 over which the plates travel, and is also supported at the points where the stock is acted upon by the medallion dies by supporting blocks 8. The plates may also be supported at the points where the stock is acted upon by the pressure rolls by supporting rollers, one of which is indicated at 9 in Fig. 5.

The work table is intermittently advanced between the cutting operations by a feed dog 10 the end of which is recessed to fit over the rolls 3. The dog is secured upon a rod 11 mounted to slide longitudinally through fixed bearings 12. The rod is reciprocated by a feed cam 13 (Fig. 1) through a lever 14 carrying a roll engaging the cam and connected at its upper end to the rod by a link 15, one end of which is pivoted to the lever, and the other end of which is pivoted to an arm 16 mounted on the rod. The arm is held from movement longitudinally to the rod by a collar 17 and lock nuts 18. That part of the rod 11 which passes through the hub of the feed dog 10 is screw-threaded, so that the position of the dog may be adjusted by turning the rod 11, the rod being provided with a squared end 19 for receiving a wrench by which it may be conveniently turned. The feed dog and its carrying rod are rocked to engage the dog with and disengage it from the rolls 3 by a rocking frame 20 mounted upon the rod and held from longitudinal movement between two of the bearings 12. This frame carries a rod 21 which passes through an arm 22 projecting rearwardly from the feed dog. The frame is rocked at proper intervals by a cam 23 which engages a roll carried by a lever 24. The lever is connected by a link 25 with an arm 26 secured to a rock shaft 27 which also carries a second arm 28 connected by a link 29 with an arm 30 which extends downward from one end of the rocking frame 20. Through these connections the feed dog is engaged with one of the rolls 3 previous to the forward or feeding movement of the dog, and is disengaged from the roll and held in raised position during its return or inactive movement. The work table is held in position between its feeding movements by locking dogs 31 and 32 arranged on opposite sides of the table, and arranged to engage the rolls 3. The dog 31 is pivoted on the pawl carrying rod 11 between two of the bearings 12, and the dog 32 is pivoted on a stud 33 at the opposite side of the feed table. The dogs are engaged with and disengaged from the rolls 3 at the proper intervals through connections with the rock shaft 27. The rock shaft is provided with an arm 34 connected by a link 35 with an arm 36 secured to the dog 31. The dog 31 is also provided with an arm 37 connected by a link 38 with one end of a lever 39, the other end of which is connected by a link 40 with an arm 41 of the dog 32 (Fig. 4).

During the interval between the feeding movements of the work table the medallions or other marks are impressed upon the stock on the table by two similar dies 42, one of which is illustrated in Fig. 4. These dies may be electrically heated, as indicated, and are mounted to reciprocate in guideways 43 arranged above the work table. The die carrying head is reciprocated in guideways by a toggle 44, the upper link of which may be adjustable, as indicated. The toggle is operated at the proper intervals through a rod 45 supported upon a link 46 and having one end connected with the knuckle of the toggle. The other end of the rod is connected to one arm of a bell crank lever 47, the other arm of which is connected by a link 48 with an arm 49 secured to a rock shaft 50. The rock shaft is provided with a second arm 51, the end of which carries a roll engaging a groove in the cam disk 52 (Figs. 1, 6 and 31). The cam disk 52 for operating the medallion dies, as well as the cams 13 and 23 for feeding and locking the work table, are secured to a shaft 53 which is intermittently rotated and makes a single revolution between successive cutting operations.

The stock from which the soles are to be cut may be placed upon the work table either automatically or manually. In the construction shown the stock is placed upon the table by the operator, and means is provided for enabling him to accurately locate the sheets of stock so that they will be brought into proper register with the cutting mechanisms by the forward movement of the table. As shown in Figs. 2 and 3, the sheets of stock are of sufficient size to cover two adjacent plates 1 of the work supporting table, and two soles are cut from each sheet of stock. The sheets of stock are provided with the usual roughened or corrugated portions for the heel and toe of the sole which are separated by a depression corresponding to the shank of the sole. In order that the stock may be conveniently and accurately positioned by the operator, a gage bar 54 is arranged above the work table, and is so mounted that it may be brought into position to be engaged with the edge s of the depression in the stock. The gage is mounted upon arms 55 secured to a rock shaft 56, and is held in raised or inactive position by the spring 57. In placing a sheet of stock upon the work table the operator passes the sheet under the gage bar, and then grasps the end of the sheet beyond the gage, passing his arm over the gage bar, as indicated in Fig. 3. After approximately positioning the sheet he may bring the gage bar down in front of the edge s on the stock by downward movement of his arm, and while holding the gage bar in position, may shift the stock until the edge s is accurately laid against the gage bar. When the operator's arm is removed after positioning the sheet, the gage bar automatically returns to inactive position. After the sheet of stock has been positioned upon the feed table by the operator, the forward travel of the table carries the stock beneath a series of pressing rolls, which smooth out any wrinkles in the stock and press the sheet uniformly down upon the table. As shown, the pressure rolls 58 are mounted in yielding bearings above the feed table, and comprise three sets of rollers adapted to engage respectively the heel, sole and shank portions of the stock.

The two cutting mechanisms are carried on a vertically movable support 59 which is raised after the cutting of the two soles is completed to disengage the cutters from the stock, and is lowered to reëngage the cutters with the stock after the feed of the work table is completed (Figs. 6, 7, 8, 20 and 22). The support is secured to guide rods 60 which are guided in fixed bearings 61 secured to the frame of the machine, and the weight of the support and the parts carried thereby is supported upon springs 62. The support carries the casing 63 in which the mechanisms for actuating the cutters are mounted, and also carries two arms 64 which are secured to the casing 63 and extend forward over the work supporting table. Near their forward ends these arms are connected to rods 65 to which the pattern supporting plates 66 are adjustably secured (Figs. 1, 6, 9 and 11). The pattern 67 for each cutting mechanism is removably secured to the under side of one of the plates 66 by means of a pin 68 and clamp 69 which are constructed to engage with recesses in the pattern.

The two cutting mechanisms are the same in construction and mode of operation. Each cutting mechanism is provided with a cutter carrying head comprising a block 70 and a vertical shaft 71 to the lower end of which the block is secured (Figs. 9 and 12 to 17). The block carries a knife blade 72 and a feed wheel 73 which engages the stock on the work table and causes a travel of the head and knife in a path corresponding to the outline of the sole to be cut. The knife blade is arranged at an inclination to the work supporting table so that the edge of the sole is cut on a bevel, as is usual in cutting rubber soles. The lower end of the block 70 is provided with segmental bearing surfaces 74 which are embraced by a bearing 75 formed at the front end of a supporting arm 76. A plate 77 is secured to the bottom of the block 70 and engages the under surface of the bearing 75 to prevent upward movement of the cutter head. The shaft 71 of the cutter head extends up through bearings 78 on the arm 76, and is provided at its upper end with a gage finger 79 adapted to engage and travel along the periphery of the pattern 67, the engaging face of the finger being located in the axis of the cutter head. In order that the head may be free to move bodily in any direction over the work supporting table under the influence of the feed wheel 73, the arm 76 which carries the head is pivotally supported at its rear end upon a shaft 80 mounted in the bearings at the front end of a second arm 81, and the rear end of the arm 81 is in turn pivotally supported to turn about a shaft 82 which is mounted in bearings 83 on the casing 63 (Figs. 8, 9 and 18).

The cutter blade 72 is arranged at an inclination to the work supporting table, so that the edge of the sole is cut on a bevel, as is usual in cutting rubber soles. The knife is also arranged that it enters the stock substantially in line with the point of engagement of the feed wheel with the stock, and so that its point of operation practically coincides with the axis of the shaft 71. The knife is carried in a knife block 84 which is secured in a segmental guideway 85 by a clamping bolt 86, so that the knife may be adjusted about its point of operation to vary its angle. The segmental guideway for the knife block is formed in the lower end of a knife carrying slide 87 which is held in a vertical guideway in the block 70 by a retaining plate 88. The point of the knife is held in continuous engagement with the surface of the work supporting table during the cutting by a spring pressed plunger 89 mounted in the retaining plate 88 and arranged to engage a lug 90 on the knife carrying slide. The slide 87 is supported when the cutter head is raised by the engagement of the lug 90 with the plate 77.

The feed wheel 73 is mounted in a carrier slide 91 provided with vertical flanges 92 engaging vertical guideways in the head 70 and retained therein by the retaining plates 93 and 94. The wheel is forced continuously against the stock on the work supporting table during the cutting by a spring 95 retained in a boss 96 on the plate 93 and engaging a lug 97 on the slide. The slide is supported when the cutter head is raised by the engagement of the lower end of the flanges 92 with the plate 77. The mechanism for rotating the feed wheel comprises a pinion 98 secured to one side of the wheel and connected with a worm wheel 99 by gears 100 and 101. The worm wheel is engaged by a worm 102 on the lower end of a shaft 103 which is mounted in the slide 91 and is provided at its upper end with a pinion 104. The pinion 104 engages an elongated pinion 105 formed on a sleeve loosely surrounding the shaft 71 within the lower bearing 78 on the arm 76. A sprocket wheel 106 is secured to the upper end of the sleeve, and is engaged by a chain 107 which also passes over a sprocket wheel 108 loosely mounted on the shaft 80. The sprocket wheel 108 is connected with a second sprocket wheel 109 which is driven through a chain 110 from a sprocket wheel 111 loosely mounted on the shaft 82. The sprocket wheel 111 is formed on the hub of a beveled gear 112 which is engaged by a similar gear 113 mounted on the casings 63 and connected with a spur gear 114 which is engaged and driven by a similar gear 115 on the forward end of a shaft 116 (Figs. 7, 8 and 9). The rear end of the shaft 116 is connected by a sprocket chain 117 with a shaft 118 mounted on the rear side of the casing 63, and this shaft is continuously driven during the cutting through a clutch 119, the construction of which will be described later (Figs. 24 and 25). Through the gearing and connections above described the feed wheel is continuously rotated, and by its engagement with the stock draws the knife through the stock in a direction dependent upon the angular position of the cutter head and feed wheel. Since the feed wheel acts upon the material adjacent to the cutting point, and tends to force it in a direction opposite to the direction of travel of the knife, the tendency of the knife to distort the material is counteracted, and the material is effectively held against distortion as the cutter is drawn through it. As the feed wheel travels over the work adjacent to the point of operation of the cutter, it also acts to progressively clamp the material as the point of operation is transferred along the outline of the sole. The feed wheel is arranged to engage the material outside of the point of operation of the knife, and the material entering into the sole is not therefore subjected to any clamping pressure tending to disfigure or distort it.

Turning movements are imparted to the cutter head to vary the angular relation of the feed wheel, and thus determine the path of travel of the head, through beveled gears 120 connecting the shaft 71 of the cutter head with a shaft 121 mounted on the arm 76 and in turn connected by beveled gears 122 with the shaft 80 (Figs. 8 and 9). The lower end of the shaft 80 is connected by beveled gears 123 with a shaft 124 mounted on the arm 81, and connected by beveled gears 125 with the shaft 82 upon which the arm is pivoted. Through this mechanism, turning movements imparted to the shaft 82 are transmitted to the cutter head to vary the angular position of the head and feed roll and thus control the direction of travel of the head.

The mechanism for turning the shaft 82 and the connected cutter head comprises a continuously rotating drum 126 the periphery of which is engaged by one or more rolls 127 which are so mounted that they travel longitudinally of the drum, and are so connected with the shaft 82 that the shaft is turned by the travel of the roll or rolls along the drum (Figs. 18 and 19). In the construction shown there are two rolls which are connected to operate in unison, a plurality of rolls being used to give additional power for actuating the shaft 82. The rolls are supported in a carriage 128 mounted to travel on rods 129 which extend longitudinally of the drum 126. The connections between the shaft 82 and the roll carriage comprise a rack 130 mounted to slide on a rod 131 and provided with a vertical arm 132, the upper end of which is provided with a slot engaged by a pin 133 on the carriage. The rack engages a gear 134 loosely mounted on the shaft 82, and connected with a disk 135 which forms one member of a double acting Horton clutch. The other member of the clutch consists of a ring 136 secured upon a hub 137 which is mounted on the shaft 82. The hub 137 is also provided with arms 138 upon which bell crank levers 139 are pivoted. The upper ends of the bell crank levers are arranged to pass between two pairs of spring pressed clutch rollers 140 which are mounted in the ring 136 on opposite sides of the disk 135, and the lower ends of the levers extend into a slot in the shaft 82 and connect the hub 137 and ring 136 with the shaft (Figs. 10 and 18). The lower ends of the levers are engaged by the upper end of a rod 141 arranged to slide within the shaft 82 and supported upon an arm 142 which is secured to a rock shaft 143. During the cutting operation the bell crank levers 139 are in the position indicated in Fig. 18, and when in such position the clutch rolls are free and connect the members of the clutch so that the shaft 82 is turned in one direction or the other according to the direction in which the roll carriage 128 is moved. By rocking the shaft 143, however, the bell crank levers may be actuated to force back the clutch rolls, as indicated in Fig. 10, thus disconnecting the shaft 82 from the roll carriage 128, so that the roll carriage may be moved without imparting movement to the shaft 82, for a purpose which will be described later.

So long as the rolls 127 are in neutral position, or with their axes parallel to the axis of the drum, there will be no longitudinal movement of the roll carriage. If the rolls are turned in either direction so that their axes are at an angle to the axis of the drum, then the rolls will tend to travel laterally or longitudinally of the drum, and will move the roll carriage 128 in one direction or the other according to the direction in which the rolls are turned, and the rate of movement in either direction will depend upon the angle of the rolls and the movement will continue until the rolls are turned into neutral position. Each roll is mounted in a yoke 144 secured to the lower end of a shaft 145, and the upper part of the yoke is provided with a collar 146 mounted in a bearing in the roll carriage and grooved to receive a series of anti-friction balls. Near its upper end each shaft 145 is supported in a ball bearing indicated at 147, which is mounted in the upper flange of a housing 148 secured to the roll carriage. A plate 149, overlies the bearing 147, and the bearing is held against the plate by a sleeve 150 loose on the shaft 145 and supported by a spring 151. The upper ends of the shafts 145 are engaged by adjusting screws 152 mounted in a yoke 153 which is pivoted on the housing 148. By adjusting these screws the rolls may be forced against the periphery of the drum 126 with the required pressure. Each shaft is provided at its upper end with a projecting arm 154 which is connected by a link 155, so that the rolls may be turned in unison to vary their angular relation to the drum. One of the arms 154 is provided with a depending pin 156 which passes through a hole in a lever 157, the hub of which surrounds the sleeve 150, and is supported upon a flange at the bottom of the sleeve. By turning the controlling lever 157 the angular position of the rolls may be varied to hold them in neutral position, or to cause them to travel laterally in either direction and thus turn the cutter head to vary or control its path of travel.

In order that the path of travel of the cutter head may correspond to the outline of the pattern 67, the cutter head should be so turned during its travel that the feed wheel carried by the head will cause the gage finger 79 to travel along the periphery of the pattern. In the machine illustrated the turning of the cutter head is automatically controlled to secure this result by a controlling feeler finger 158 which engages the periphery of the pattern in advance of the gage finger 79, and is so connected with the rolls 127 that the angular position of the rolls is determined by the position of the controller finger (Figs. 7, 8, 9, 11, 13, 18 and 19). The controller finger is in the form of a lever pivoted on the upper end of the shaft 71, and having its lower end arranged to engage a lever 159 also pivoted to the upper end of the shaft. The free end of the lever 159 engages the upper end of a sleeve 160 which is mounted to slide and turn freely upon the shaft 71, and is provided with a flange 161 engaging the front end of a lever 162. The lever 162 is supported upon the arm 76, and its rear end engages the front end of a lever 163 supported upon the arm 81, the point of engagement between the levers being in the axis of the shaft 80. The rear end of the lever 163 is connected by a link 164 with an arm 165 which projects from a rock shaft 166. The rock shaft is provided with rearwardly projecting arms 167 which carry a bar 168 grooved to engage a roll 169. The roll 169 is adjustably secured to the horizontal arm of a bell crank lever 170, which is pivoted on the roll carriage 128, and is provided at its upper end with a gear segment 171 engaging a similar gear segment formed on the roll operating lever 157. The rock shaft 166 is forced yieldingly in a direction to hold the controller finger 158 against the periphery of the pattern 67 by a light spring 172.

The parts are so arranged that the rolls 127 will be held in neutral position when the finger 158 and the gage finger 79 are in line with each other in the direction of the travel of the cutter head, and so long as this condition exists the cutter head will travel in a straight line. If the controller finger 158 moves forward or back out of line with the gage finger 79 by reason of the curvature of the pattern, then the rolls will be turned through the connections described at an angle to the direction of travel of the drum 126, the extent to which they are turned depending upon the curvature of the pattern at the point engaged by the fingers 79 and 158. This will cause a travel of the rolls and roll carriage longitudinally of the drum, which will turn the shaft 82 and the connected cutter head so that the feed wheel in the head will change the direction of travel of the head to correspond to the curvature of the pattern. The angular position of the cutter head, and of the feed wheel and knife carried thereby, will thus be automatically controlled to cause the cutter to travel in the path corresponding to the contour of the pattern, and to keep the knife blade in proper relation to its line of travel.

In the machine shown the cutter head travels around the pattern, and in so doing is turned through a complete revolution. During this travel and revolution of the cutter head the rolls 127 will have traveled a certain distance longitudinally of the drum 126, and should be returned to their original or initial position prior to the cutting of the next sole. In order that the rolls may be returned to their initial position without imparting movement to the cutter head, the shaft 143 is rocked at the completion of the cutting to actuate the bell crank levers 139 and disengage the clutch members 135 and 136. As before stated, the support 59 is raised at the completion of the cutting operation to disengage the cutters from the stock on the work supporting table. During this upward movement, a roll on the upper end of a bell crank lever 173 which is carried by a plate 174 connecting the arms 64, rides along a cam 175 which is fixed to the frame of the machine, and rocks the lever. The horizontal arm of the lever is connected by a link 176 with an arm 177 secured to the rock shaft 143, so that the rocking of the bell crank lever rocks the rock shaft 143 to disengage the clutch, as above described. The lever 173 is provided with two horizontal arms which are connected respectively to actuate the rock shafts 143 of the two cutter mechanisms when the support carrying the cutter mechanism is raised to disengage the cutters from the stock.

The upward movement of the support 59 at the completion of the cutting operation also brings the arm 165 against a stop finger 178 which is pivoted to a bracket 179 and is held in position against an adjustable screw 180 by a spring 181 (Figs. 7 and 18.) By its engagement with the finger 178 the arm 165 is moved to rock the shaft 166 and turn the rolls 127 so that they will travel along the drum toward their initial or starting position. As the rolls reach their initial position, a projection 182 on the segment arm 170 strikes the end of a stop screw 183, so that the arm is turned by the travel of the roll carriage until the rolls are brought into neutral position, when the travel of the rolls and roll carriage ceases. The stop finger 178 yields to allow the rolls to swing into neutral relation to the drum 126 when the rolls are operated by engagement of the segment arm 170 with the screw 183. When another cutting operation is to begin, the support 59 moves down to reengage the knife and feed roll with the stock, and during this movement the rock shaft 143 is operated to permit reëngagement of the clutch, the arm 165 moves away from the stop finger 178, and the projection 182 on the segment arm 170 moves into position below the screw 183. This brings the parts into position to again control the cutter head, feed roll and knife in the manner already described.

To prevent the cutter head from swinging away from the pattern 67 when the cutter head is raised from the stock, the upper end of the shaft 71 is provided with a roll 184 arranged to engage the inner surface of a flange 185 formed at the edge of the pattern (Fig. 13). The roll is carried on the upper end of an arm 186 pivoted to the upper end of the shaft, and is held against the flange by a spring 187. When the pattern is to be removed, the roll carrying arm 186 may be swung down into the dotted line position indicated in Fig. 13, so that the cutter head may be swung away from the pattern.

As above stated, the mechanism for actuating the feed roll of each cutter head is driven through a clutch indicated at 119 in Fig. 24. As shown, the clutches 119 are a form of Horton clutch, the rolls 188 of which are arranged to wedge between the inner periphery of the driving members 189 and the eccentric surfaces 190 formed on disks 191 which are secured to the shafts 118. The clutch rolls of each clutch are controlled to throw the clutch into and out of action by lugs 192 formed on a sleeve 193, which is also provided with a stop shoulder 194 adapted to be engaged by the hooked end of a controlling lever 195. The clutch remains in action so long as the end of the lever 195 is out of the path of the stop shoulder 194, and is thrown out of action when the lever is moved into the path of the stop shoulder and arrests the rotation of the roll carrying sleeve 193. The driving member 189 of each clutch is secured upon a sleeve 196 mounted to turn loosely about the shaft 118 and also carrying a sprocket wheel 197. The driving members are continuously driven during the operation of the machine by a sprocket chain 198 which passes over the sprocket wheels 197, over guide pulleys 199, and about a sprocket wheel 200 which is loosely mounted on a shaft 201 (Figs. 20, 21 and 23). The sprocket wheel 200 is driven through a bevel gear 202 secured to its hub and engaged by a pinion 203 secured to a shaft 204 which is continuously driven from the main driving pulley 205 of the machine through a belt 206. The drum 126 is also continuously driven from the shaft 204 through a sprocket chain 207 (Fig. 8).

During the operation of each cutter head the corresponding clutch controlling lever 195 is held out of active position against the tension of its actuating spring 208 by a latch 209 the lower end of which is pivoted upon a fixed bar 210 forming a part of the frame of the machine, the latch being held in position to engage the controller lever by a spring 211. The latch is operated to release the controller lever and thus throw the clutch 119 out of operation by devices which are operated by the cutter head as it completes the cutting of a sole (Figs. 6 to 9, 11, 20 and 24). These devices comprise a trip lever 212 the lower end of which is arranged to be engaged by the gage finger 79 of the cutter head as the head completes its travel around the pattern 67. The upper end of the trip lever is connected by a link 213 with a lever 214, the lower end of which is pivoted on the casing 63, and the upper end of which is connected by a link 215 with one arm of a bell crank lever 216. The other arm of the bell crank lever is connected by a link 217 with one arm of a second bell crank lever 218, the other arm of which is arranged to engage the latch 209. When the trip lever 212 is engaged by the finger 79 on the cutter head, it operates through the connections described to disengage the latch 209 and throw the clutch which drives the feed roll and the cutter head out of action. The trip lever is pivoted on a supporting arm 219 which is in turn pivoted at 220 to the pattern carrying plate 66, and is forced downward to bring the trip lever into the path of the finger 79 by a spring 221. At the beginning of the cutting operation the trip lever is held out of the path of the gage finger by a latch 222 pivoted on the free end of the supporting arm 219 and arranged to engage a shoulder on the plate 66 (Fig. 9). The lower end of the latch 222 extends down into the path of the gage finger 79.

At the beginning of the cutting operation the parts are substantially in the position indicated in Fig. 6, with the trip lever held out of the path of the gage finger 79 on the cutter head. After the gage finger has traveled about the heel end of the pattern, and as it moves forward from the position indicated in Fig. 11, it strikes the latch 222 and disengages it from the plate 66, so that the supporting arm 219 moves downward to bring the trip lever into the path of the gage finger. After this gage finger has traveled about the pattern and has passed its initial position, it strikes the trip lever and throws the driving clutch for the feed wheel out of operation in the manner described, so that the travel of the cutter head ceases after it has passed its initial or starting point.

After the travel of the cutter head has been arrested, the cutter head is returned to its initial or starting position, and the trip lever is reset out of the path of the gage finger 79, so that it will not be operated at the beginning of the next cutting operation. The devices for accomplishing this comprises a bell crank lever 223 pivoted to a bracket which is secured to the plate 174. The vertical arm of the lever is provided with a hole 224 through which the link 213 passes, and with a second hole 225 which surrounds the rear end of a rod 226, the front end of which is connected to the arm 219 which supports the trip lever. The link 213 is provided with a collar 227 arranged at the rear of the lever 223 and the rod 226 is provided with a similar collar 228. The horizontal arm of the bell crank lever 223 is provided with a pin 229 arranged between two flanges 230 formed on a fixed stud 231 which is adjustably secured in a fixed part of the frame. When the support 59 is raised to disengage the cutter heads from the stock, the pin 229 moves idly between the flanges 230 until the knife and feed wheel have been disengaged from the stock, and then the pin engages the upper flange. During the further upward movement of the support the lever 223 is swung toward the right in Fig. 8, so that its vertical arm first strikes the collar 227 and moves the link 213 toward the right, thus swinging the lower end of the trip lever 212 toward the left. At this time the gage finger 79 is in engagement with the lower end of the trip lever so that the cutter head is moved back toward the left into its starting position. During the latter part of the movement of the lever 223 its vertical arm engages the collar 228, moving the rod 226 toward the right, and lifts the arm 219 so that the trip lever is moved out of the path of the gage finger, and the latch 222 is brought into position to engage the plate 66. The shifting of the link 213 toward the right also disengages the bell crank lever 218 from the latch 209, so that the latch may be returned to normal position by its spring as the upward movement of the support 59 carries the clutch controlling lever 195 above the free end of the latch.

Each cutter head is operated independently of the other, and one of the heads may therefore remain in action longer than the other. In order that the cutter heads may not be raised until both heads have completed the cutting, the mechanism for raising the support 59 which carries the cutter mechanisms is thrown into operation upon the arrest of the cutting mechanism which is the last to finish its cut. The mechanism for raising and lowering the support comprises toggles 232 which are connected by a link 233 and are operated by a crank 234 connected with one of the toggles by a link 235 (Figs. 22 and 23). The crank is secured to the end of the shaft 201 which is given a half revolution at proper intervals to raise and lower the support by a Horton clutch the construction of which is indicated in Figs. 23 and 24. The driving member 236 of the clutch is formed on the hub of the continuously rotating sprocket wheel 200, and is provided with an internal bearing ring 237 for engaging the rolls 238 which are arranged between the driving member and clutching faces 239 formed on the driven member 240 of the clutch. The roll controlling ring 241 is formed on a sleeve 242 which is loosely mounted on the shaft 201 and is provided with a stop shoulder 243. The stop shoulder coöperates with the hooked end of a clutch controlling lever 244 in the usual manner. The lever 244 is disengaged from the shoulder 243 to throw the clutch into operation through the lever 245 connected with it through a link 246. The lever 245 is pivoted to the fixed bar 210, and is connected by a link 247 with a second lever 248 pivotally supported upon a bracket 249 in turn secured to the casing 63 carried by the vertically movable support 59. A spring 250 is connected to the lever 248, and tends to move the lever in a direction to raise the clutch controlling lever 244 to throw the clutch into operation. The lever is held against the tension of the spring 250 by the engagement of its ends with controller segments 251 formed on the clutch controlling levers 195 and provided with notches 252 adapted to be engaged by projections on the ends of the lever 248.

So long as the cutter mechanisms are in operation, the ends of the lever 248 ride on the segments 251. When one of the cutter mechanisms completes its cut and is arrested, the movement of the corresponding controller lever 195 into position to stop its clutch 119 brings the notch 252 into register with the end of the lever 248. The other end of the lever, however, still rides on the other segment 251 until the second cutter mechanism completes its cut and is arrested. The movement of the second controller lever 195 into position to arrest the corresponding cutting mechanism brings the second notch 252 into register with the end of the lever 248, so that the lever is swung about its pivot by the spring 250. This movement of the lever raises the clutch controlling lever 244 so that the clutch members 236 and 240 are connected to impart movement to the crank shaft 201. The crank shaft now makes a half revolution to raise the support 59 and the cutter mechanisms carried thereby, and the clutch is then thrown out by the engagement of a second stop shoulder 243' on the roller ring with the end of the controller lever 244. The end of the controller lever is returned into position to engage the second stop shoulder on the roller ring during the half revolution of the clutch by a cam flange 253 arranged to act on a roll 254 on a controller lever and formed on a disk 255 which is secured to the roller sleeve 242. After the clutch has made a half revolution, and is thrown out, the controller lever 244 is maintained in engagement with the stop shoulder 243' against the tension of the spring 250 by a latch 256 arranged to engage a shoulder 257 on the controller lever. The latch is normally out of the path of the shoulder, but is moved into position over the shoulder by the upward movement of the support 59. The devices for thus moving the latch comprise a hook 258 pivoted to the support 59 and arranged to engage a pin 259 projecting from an arm 260 which is secured to a rock shaft 261. The rock shaft carries a vertical arm 262 the upper end of which is provided with a hole surrounding a rod 263, one end of which is pivoted to the latch 256, and the other end of which carries nuts 264 for engaging the end of the arm 262. A spring 265 is interposed between the arm 262 and a shoulder on the rod 263. When the support 59 is raised the hook rocks the shaft 261, and the arm 262, acting against the spring 265, forces the latch into position above the shoulder on the clutch controlling lever where it remains until the support 59 is to be lowered to reëngage the cutting mechanisms with the stock.

The upward movement of the support 59 at the end of the cutting operation also throws into operation the mechanism for giving the shaft 53 which carries the cams for advancing the work table and operating the medallion impressing mechanism a single revolution. The devices through which this is accomplished comprise an arm 266 secured to the rock shaft 261 and arranged to engage an adjustable screw 267 carried by an arm 268 which is loosely pivoted on the rock shaft 261 and is connected by a link 269 with one arm of a bell crank lever 270 (Fig. 21). The other arm of the bell crank lever is connected to a rod 271, the vertical movements of which control the engagement and disengagement of a clutch and brake mechanism which is indicated at 272, and may be of any usual or well-known construction. This clutch mechanism serves to connect and disconnect a shaft 273 with the driving pulley 205 of the machine. The shaft 273 is connected through a worm 274 and worm wheel 275 with the cam shaft 53. A spring 276 tends to move the clutch controlling rod 271 downward or in a direction to disengage the clutch and engage the brake of the mechanism 272. When the shaft 261 is rocked by the upward movement of the support 59, the arm 268 is swung toward the left, from the position indicated in Fig. 26 to the position indicated in Fig. 29, thus raising the clutch controlling rod 271 and throwing the clutch of the mechanism 272 into operation. The cam shaft 53 is now driven through a single revolution, and during this revolution the cams carried by the shaft first operate to unlock and feed forward the work supporting table, to then throw into operation the clutch which lowers the support 59 carrying the cutter mechanisms, to then operate the medallion impressing mechanism, and to return the table feeding mechanism and medallion impressing mechanism to normal position.

The devices for engaging the clutch members 236 and 242 to lower the support 59 consist of a cam 277 formed on the cam disk 52 and arranged to engage one arm of a lever 278 which is loosely pivoted on a stud 279, and the other arm of which carries a pin 280 arranged to engage an arm 281 secured to a rock shaft 282. The rock shaft carries a second arm 283 arranged to operate upon the lower end of the hook 258, and a third arm 284 which is normally held in engagement with the support bracket 285 by a coiled spring 286 (Fig. 30). When the end of the arm 278 rides on to the cam 277, as indicated in Fig. 28, the devices described are operated to disengage the hook 258 from the arm 260, thus releasing the rock shaft 261 so that it may swing from the position indicated in Fig. 29 to the position indicated in Fig. 28. This movement of the rock shaft withdraws the latch 256 from engagement with the clutch controlling lever 254, and the lever is immediately raised to allow the clutch members to be engaged. The clutch makes a half revolution and is again thrown out by the engagement of the stop shoulder 143 with the controller lever. This half revolution of the clutch and shaft 201 lowers the support 59 and engages the cutting mechanisms with the stock. During the downward movement of the support the controlling levers 195 for the clutches 119 are engaged by the latches 209, and are operated to throw the clutches into operation. This movement of the levers 195 also brings the segments 251 into position to be engaged by the ends of the lever 248 as the support 59 moves downward, so that during the cutting operation the clutch controlling lever 254 is held in position with its end in engagement with the stop 243 by these segments.

When the rock shaft 261 is released by the cam 277, as above described, the arm 268 is retained in the position indicated in Figs. 28 and 29 by a hook 287, so that the driving clutch for the cam shaft 53 remains in engagement. As the shaft 53 completes its revolution, the hook 287 is disengaged from the arm 268 by a cam 288 formed on the cam disk 52 and arranged to engage the end of a lever 289 which is loosely pivoted on the stud 279. The other end of the lever carries an adjustable screw 290 arranged to engage an arm 291 projecting downwardly from the hub of the hook 287. The hook is forced yieldingly in a direction to engage the arm 268 by a spring 292. When the hook is disengaged from the arm 268 by the cam 288, the arm is released and the spring 276 raises the rod 271 to disengage the driving clutch and apply the brake of the mechanism 272, thus arresting the rotation of the shaft 53. The parts are now in the position indicated in Figs. 24 and 26, and remain in this position until the cutting mechanisms have completed their cuts, when the cycle of operations is repeated.

While the machine shown and described is provided with two cutting mechanisms, it will be understood that this is not essential, and that various features of the invention may be embodied in machines provided with a single cutting mechanism, and that other features of the invention may be embodied in machines provided with more than two cutting mechanisms.

It will also be understood that the specific construction and mode of operation of the cutting mechanisms is not material except so far as may be set forth in the claims.

It will also be understood that various features of the invention are not limited in their application to machines in which the mechanism or mechanisms for operating upon the material are cutting mechanisms, but may be embodied in machines provided with other forms of mechanisms for operating upon the material or work.

Having explained the nature and object of the invention, and specifically described one form of machine in which it may be embodied, what I claim is:—

1. A machine for cutting sheet rubber having, in combination, cutting mechanism, stamping mechanism, and means for presenting the work successively to said mechanisms and retaining it in fixed position with relation to said mechanisms during their operation.

2. A machine for cutting sheet rubber having, in combination, a work support, cutting mechanism, stamping mechanism, and mechanism for actuating the work support to present the work successively to said mechanisms and for holding it in fixed position with relation to said mechanisms during their operation.

3. A machine for cutting sheet rubber, having, in combination, a work support, cutting mechanism arranged to operate on the material on the work support, mechanism for rolling sheet rubber down upon the support, and mechanism for actuating the support and cutting mechanism.

4. A machine for cutting sheet rubber, having, in combination, a traveling work supporting table, compressing rolls arranged to press a sheet of rubber on the work supporting table, sole cutting mechanism arranged to operate on the sheet on the work support, and mechanism for intermittently actuating the work support and intermittently actuating the sole cutting mechanism.

5. A machine for cutting sheet rubber, having, in combination, a work support, a traveling cutter head mounted over the work support, medallion impressing mechanism, mechanism for intermittently engaging the cutter with the material and for actuating the cutter head, and mechanism for intermittently actuating the work support and medallion impressing mechanism controlled from the cutter head actuating mechanism.

6. A machine for cutting sheet rubber, having, in combination, an endless work supporting table comprising side bars pivoted together, plates secured to the side bars, longitudinal guides for the side bars, intermittently reciprocating feeding dogs for engaging the side bars, and alternately operating locking dogs for engaging the side bars.

7. A machine for cutting sheet rubber, having, in combination, a traveling work supporting table, and a vertically movable gage normally held above the table and arranged to be brought into active position over the material by the operator in placing the material on the table.

8. A machine for cutting sheet rubber, having, in combination, a traveling work supporting table, pressing rolls under which the table travels, and cutting mechanism to which the material is presented by the table after passing under the rolls.

9. A machine for cutting sheet rubber, having, in combination, a traveling work supporting table, pressing rolls under which the table travels, cutting mechanism to which the material is presented by the table after passing under the rolls, and stamping mechanism.

10. A machine for cutting sheet rubber, having, in combination, a traveling work supporting table for supporting sole stock, and a gage bar 54 pivotally supported over the table in position to be engaged with the stock by the operator in placing the stock upon the table, and means for holding the bar normally out of active position when not moved down by the operator.

11. A machine for cutting sheet material, having, in combination, a work supporting table, a traveling cutter head, mechanism for intermittently raising and lowering the cutter head, stamping mechanism, mechanism for intermittently actuating the stamping mechanism, and mechanism for actuating the work supporting table while the cutter head is raised and the stamping mechanism inactive.

12. A machine for cutting sheet material, having, in combination, a work supporting table, a plurality of cutters mounted to travel over the table, actuating mechanisms for feeding the cutters in a path corresponding to the outlines of the articles to be cut, means for arresting the travel of each cutter as it completes its cut, stamping mechanism, and mechanism rendered active upon the arrest of the last cutter in action for disengaging the cutters from the material actuating the work supporting table and actuating the stamping mechanism.

13. A machine for cutting sheet rubber, having, in combination, a traveling work supporting table, pressing rolls under which the table travels, a traveling cutter head arranged to travel over the work support, and means for intermittently advancing the table.

ERASTUS E. WINKLEY.

Witnesses:
BURTON W. CARY,
N. D. McPHAIL.